US012313982B2

(12) United States Patent
Tokiwa et al.

(10) Patent No.: US 12,313,982 B2
(45) Date of Patent: May 27, 2025

(54) IMAGE FORMING APPARATUS HAVING LONGER TERM ANTI-FOGGING

(71) Applicant: CANON KABUSHIKI KAISHA, Tokyo (JP)

(72) Inventors: Shuhei Tokiwa, Tokyo (JP); Norihiro Shirahata, Tokyo (JP); Satoru Motohashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/394,127

(22) Filed: Dec. 22, 2023

(65) Prior Publication Data

US 2024/0219858 A1 Jul. 4, 2024

(30) Foreign Application Priority Data

Dec. 28, 2022 (JP) ................................ 2022-212533

(51) Int. Cl.
*G03G 15/00* (2006.01)
*G03G 9/097* (2006.01)
(Continued)

(52) U.S. Cl.
CPC ......... *G03G 15/0216* (2013.01); *G03G 9/097* (2013.01); *G03G 15/065* (2013.01); *G03G 15/5008* (2013.01)

(58) Field of Classification Search
USPC .......................................................... 399/174
See application file for complete search history.

(56) References Cited

U.S. PATENT DOCUMENTS 9,134,649 B2 9/2015 Orihara et al.
9,207,556 B2 12/2015 Kosasa et al.
(Continued)

FOREIGN PATENT DOCUMENTS

JP 2001-290302 A 10/2001
JP 2007-093981 A 4/2007
(Continued)

OTHER PUBLICATIONS

European Search Report mailed Apr. 15, 2024, in related European Patent Application No. 23219137.9.

*Primary Examiner* — Quana Grainger
(74) *Attorney, Agent, or Firm* — VENABLE LLP

(57) ABSTRACT

An image forming apparatus includes a control portion to execute a first operation in which a charging voltage applying portion generates a first potential difference that generates an electrostatic force to move developer from a charging member to an image bearing member, a second operation in which a developing voltage applying portion generates a second potential difference that generates an electrostatic force to move developer from the image bearing member to a developer bearing member, and a third operation in which a transfer voltage having a polarity corresponding to the normal charging polarity of the developer by the transfer voltage applying portion is applied while the developer passes through a transfer portion where the developer is transferred to a developer member. A region on a surface of the image bearing member where the second potential difference is generated in the second operation includes a region where the first potential difference is generated in the first operation.

16 Claims, 17 Drawing Sheets

(51) Int. Cl.

| | |
|---|---|
| ***G03G 15/02*** | (2006.01) |
| ***G03G 15/06*** | (2006.01) |

(56) References Cited

U.S. PATENT DOCUMENTS

| | | | | |
|---|---|---|---|---|
| 9,298,128 | B2 | 3/2016 | Orihara et al. | |
| 2016/0097986 | A1 | 4/2016 | Hiramatsu et al. | |
| 2019/0121255 | A1* | 4/2019 | Mitsui | G03G 15/5008 |
| 2020/0150555 | A1* | 5/2020 | Ikada | G03G 15/0812 |
| 2022/0269206 | A1 | 8/2022 | Tetsuno et al. | |
| 2024/0103396 | A1 | 3/2024 | Shirahata | |

FOREIGN PATENT DOCUMENTS

| | | | |
|---|---|---|---|
| JP | 2008-090234 | A | 4/2008 |
| JP | 2015-125292 | A | 7/2015 |
| JP | 2022-092546 | A | 6/2022 |

* cited by examiner

FIG. 3 DEVELOPMENT AND COLLECTION SEQUENCE OPERATION, EXAMPLE 1

EXAMPLE 1 (t3)

DEVELOPMENT AND COLLECTION SEQUENCE OPERATION EXAMPLE 2

FIG. 9 DEVELOPMENT AND COLLECTION SEQUENCE OPERATION EXAMPLE 3

FIG. 10 DEVELOPMENT AND COLLECTION SEQUENCE OPERATION EXAMPLE 5

FIG. 11 TONER PURGE OPERATION, COMPARATIVE EXAMPLE 1

FIG. 12 CHARGING ROLLER CLEANING OPERATION, COMPARATIVE EXAMPLE 2

IMAGE FORMING APPARATUS HAVING LONGER TERM ANTI-FOGGING

BACKGROUND OF THE INVENTION

Field of the Invention

The present invention relates to an image forming apparatus that forms an image on a recording material.

Description of the Related Art

One of the image defects observed in image forming apparatuses that use an electrophotographic recording methods is called fogging. Fogging is a phenomenon in which, in contrast to an image region where an electrostatic latent image formed on the surface of a photosensitive drum as an image bearing member has been formed, toner as developer adheres to non-image regions where the surface potential of the photosensitive drum is higher on the normal polarity side of the toner than in the image region. It is known that the charge quantity of the developer greatly contributes to the generated amount of fogging, and it is necessary to appropriately control the normal-polarity charge quantity of the developer in order to suppress fogging.

A technique for stabilizing the charging performance by using inorganic particles showing charge polarity opposite to that of a toner as an external additive has been reported as a means for increasing the charging performance of the toner. For example, a technique for stabilizing the charging performance by using a titanic acid compound represented by strontium titanate as an external additive is publicly known as disclosed in Japanese Patent Application Publication No. 2001-290302. By using the configuration disclosed in Japanese Patent Application Publication No. 2001-290302, the occurrence of fogging can be suppressed to some extent.

However, where an image forming apparatus is used for a long period of time, fogging may worsen and cause image defects. This is because the external additive migrates to the non-image formation portion of the photosensitive drum during image formation, and the amount of external additive in the developer container decreases, thereby reducing the charge quantity of the toner.

SUMMARY OF THE INVENTION

An object of the present invention is to provide a technique that can maintain good image quality during long-term use of an image forming apparatus.

In order to solve the above problems, the image forming apparatus of the present invention includes the following:

an image bearing member configured to rotate;

a charging member configured to contact with the image bearing member and to rotate while forming a charging portion, the charging member charging a surface of the image bearing member at the charging portion;

a charging voltage applying portion configured to apply charging voltage to the charging member;

an exposure unit configured to expose the surface of the image bearing member charged by the charging member;

a developer bearing member configured to bear developer, face the image bearing member at a development portion, and supply the developer to the surface of the image bearing member;

a developing voltage applying portion configured to apply developing voltage to the developer bearing member;

a transfer member configured to transfer the developer, which has been supplied to the surface of the image bearing member at a transfer portion onto a transferred member;

a transfer voltage applying portion configured to apply transfer voltage to the transfer member;

a cleaning member configured to contact with the image bearing member at a cleaning portion which is formed on a downstream side of the transfer portion and on an upstream side of the charging portion in a rotating direction of the image bearing member; and a control portion configured to control the charging voltage applying portion, the developing voltage applying portion, and the transfer voltage applying portion, wherein the control portion can execute a first operation to move the developer from a surface of the charging member to the surface of the image bearing member by controlling the charging voltage applying portion;

a second operation to move the developer from the surface of the image bearing member to the developer bearing member by controlling the charging voltage applying portion and the developing voltage applying portion; and a third operation to supply the developer to the cleaning portion by controlling the charging voltage applying portion, the developing voltage applying portion, and the transfer voltage applying portion, wherein in the first operation, between the charging member and the image bearing member, the control portion controls the charging voltage applying portion so as to generate a first potential difference that generates an electrostatic force to move developer, which is charged to an opposite polarity to a normal charging polarity of the developer, from the charging member to the image bearing member, wherein in the second operation, between the image bearing member and the developer bearing member, the control portion controls the developing voltage applying portion so as to generate a second potential difference, that generates an electrostatic force to move developer, which is charged to an opposite polarity opposite to the normal charging polarity of the developer, from the image bearing member to the developer bearing member; and wherein a region on the surface of the image bearing member where the second potential difference is generated in the second operation includes a region where the first potential difference is generated in the first operation.

According to the present invention, it is possible to maintain good image quality during long-term use of the image forming apparatus.

Further features of the present invention will become apparent from the following description of exemplary embodiments with reference to the attached drawings.

DESCRIPTION OF THE EMBODIMENTS

Embodiment 1

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Example 1

Overall Configuration of Image Forming Apparatus

Figure 1:
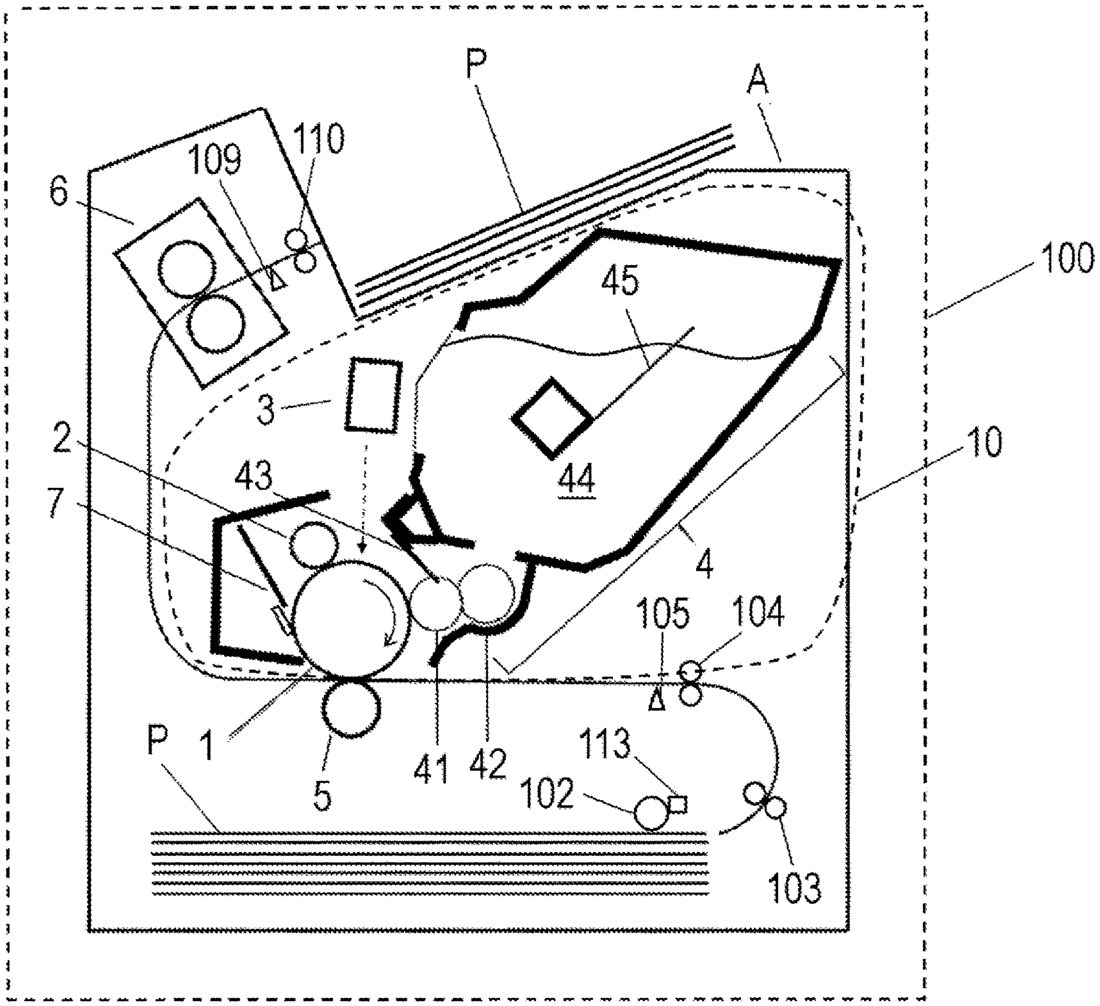
FIG. 1 is a cross-sectional view of an image forming apparatus in Example 1.

The overall configuration of an image forming apparatus will be described with reference to FIG. 1. FIG. 1 is a cross-sectional view of a schematic configuration of an image forming apparatus according to an example of the present invention, the configuration being shown in a simplified manner.

Here, the image forming apparatus to which the present invention is assumed to be applied is typically an image forming apparatus using an electrophotographic recording method, such as a laser printer, a copying machine, or a facsimile.

In this example, a so-called monochrome image forming apparatus, that is, an image forming apparatus equipped with a single image forming unit is exemplified, but the image forming apparatus to which the present invention is applicable is not limited to this. For example, the present invention can be suitably applied to a so-called full-color image forming apparatus, that is, an image forming apparatus equipped with a plurality of image forming units. The first difference in device configuration between a monochrome image forming apparatus and a color image forming apparatus is that the colors and number of colors of images formed are different. That is, in a monochrome image forming apparatus, an image of a single color (typically black) can be formed, whereas in a color image forming apparatus, images of freely determined colors can be formed by superimposing a plurality of developer images of different colors on each other. Furthermore, in an intermediate transfer type color image forming apparatus, a developer image is first transferred from a photosensitive member as an image bearing member to an intermediate transfer member (also referred to as a second image bearing member) as a first transferred member. The image is then transferred from the intermediate transfer member to a recording material serving as a second transferred member. Meanwhile, in a monochrome image forming apparatus or a direct transfer type color image forming apparatus, a developer image is directly transferred from a photosensitive member to a recording material.

An image forming apparatus 100 according to this example includes a process cartridge 10. The process cartridge 10 includes a photosensitive drum 1 as an image bearing member. A charging roller 2 as a charging member for charging the surface of the photosensitive drum 1, and a developing roller 41 as a developer bearing member for developing an electrostatic image formed on the surface of the photosensitive drum 1 with developer 44 are provided around the photosensitive drum 1 of the process cartridge 10. The process cartridge 10 further includes a developing blade 43 as a developer regulating member that regulates and charges the toner on the developing roller 41, and a supply roller (toner supplying member) 42 that supplies toner to and strips toner from the developing roller 41. The formed electrostatic latent image is developed as a toner image (developer image) by the toner holding a normal charge that was formed on the developing roller 41.

The image forming apparatus 100 is equipped with a transfer roller 5 as a transfer member that abuts against the photosensitive drum 1 and transfers the toner to a recording material P, and a scanner unit (laser exposure unit) 3 as an exposure unit for forming an electrostatic latent image corresponding to image data on the charged photosensitive drum 1.

The image forming apparatus 100 is equipped with power supplies (see FIG. 13) for applying predetermined voltages to each of the charging roller 2, developing roller 41, developing blade 43, supply roller 42, and transfer roller 5.

The photosensitive drum 1 is a photosensitive member formed in a cylindrical shape. The photosensitive drum 1 of the present embodiment has a photosensitive layer formed of a negatively chargeable organic photosensitive member on a drum-shaped base made of aluminum. The photosensitive drum 1 has a diameter of 24 mm and is rotationally driven by a motor in a predetermined direction (clockwise in the figure) at a predetermined process speed. The photosensitive drum 1 of the present embodiment is rotationally driven at a process speed of 260 mm/sec.

The charging roller 2 has a diameter of 8.5 mm and contacts the photosensitive drum 1 with a predetermined pressing force to form a charging portion. Further, the charging roller 2 uniformly charges the surface of the photosensitive drum 1 to a predetermined potential by applying a desired charging voltage from a charging high-voltage power supply. In the present embodiment, the photosensitive drum 1 is negatively charged by the charging roller 2.

The scanner unit 3 as an exposure portion scans and exposes the surface of the photosensitive drum 1 by using a polygon mirror to irradiate the photosensitive drum 1 with a laser beam corresponding to image information input from an external device or a reading device. Through this exposure, an electrostatic latent image corresponding to the image information is formed on the surface of the photosensitive drum 1. The scanner unit 3 is not limited to a laser scanner device, and for example, an LED exposure device having an LED array in which a plurality of LEDs is arranged along the longitudinal direction of the photosensitive drum 1 may be employed.

The developing device portion of the process cartridge 10 includes a developing roller 41 as a developer bearing member that bears the developer, a developer container 4 serving as a frame constituting a developer storage portion, and a supply roller 42 that can supply the developer 44 to the developing roller 41. The developing roller 41 and the supply roller 42 are rotatably supported by the developer container 4. Further, the developing roller 41 has a diameter of 10 mm and is arranged at the opening portion of the developer container 4 so as to face the photosensitive drum 1. The supply roller 42 abuts rotatably against the developing roller 41, and the toner contained as the developer 44 in the developer container 4 is applied to the surface of the developing roller 41 by the supply roller 42. The supply roller 42 is not necessarily required if the configuration is such that the toner can be sufficiently supplied to the developing roller 41.

The process cartridge 10 of the present embodiment uses a contact development method as a development method. That is, the toner layer supported on the developing roller 41 comes into contact with the photosensitive drum 1 in a development portion (development region) where the photosensitive drum 1 and the developing roller 41 face each other. A developing voltage is applied to the developing roller 41 by a development high-voltage power supply. Under the developing voltage, the toner borne on the developing roller 41 is transferred from the developing roller 41 to the drum surface according to the potential distribution on the surface of the photosensitive drum 1, whereby the electrostatic latent image is developed into a toner image. In the present embodiment, a reversal development method is used. That is, after being charged in the charging step, toner adheres to the surface region of the photosensitive drum 1 where the charge quantity has been attenuated by the exposure in the exposure step, thereby forming a toner image.

Further, in the present embodiment, a toner having a particle size of 7 μm and a negative normal charging polarity is used. The toner of the present embodiment is, for example, a polymerized toner produced by a polymerization method. Further, the toner of the present embodiment is a so-called non-magnetic one-component developer that does not contain a magnetic component and is supported on the developing roller 41 mainly by intermolecular force or electrostatic force (image force). However, a one-component developer containing a magnetic component may also be used.

In addition to the toner particles, the one-component developer may contain additives as external additives for the purpose of modifying the surface properties in order to adjust the flowability and charging capability of the toner. In order to modify the surface properties of the toner, it is possible to form and use an inorganic salt on the toner surface. Examples of the inorganic salts to be formed on the toner surface used in the present embodiment include silica, alumina, titanium oxide, aluminum oxide, barium titanate, magnesium titanate, calcium titanate, and strontium titanate. Alternatively, zinc oxide, tin oxide, silica sand, clay, mica, wollastonite, diatomaceous earth, chromium oxide, cerium oxide, red iron oxide, antimony trioxide, and magnesium oxide can also be used. Alternatively, zirconium oxide, barium sulfate, barium carbonate, calcium carbonate, silicon carbide, silicon nitride, and the like can also be used. In the following explanation, these external additives can be sometimes referred to as positive external additives, that is, positive-charging external additives of charge polarity opposite to the toner having negative charge polarity as normal polarity. Furthermore, a two-component developer composed of a non-magnetic toner and a magnetic carrier may be used as the developer. When using a magnetic developer, for example, a cylindrical developing sleeve with a magnet disposed inside is used as the developer bearing member. That is, here, the developer can be in the form consisting only of toner particles, the form consisting of toner particles and an additive or a carrier, and the like. In the following explanation, developers inclusive of these various forms may be referred to as toner 44.

The developer container 4 is provided with a stirring member 45 as a stirring portion disposed inside. The stirring member is driven and rotated by a main motor 250 shown in FIG. 13, thereby stirring the toner in the developer container 4 and feeding the toner toward the developing roller 41 and the supply roller 42. The stirring member 45 is not limited to a rotary form. For example, a swinging stirring member may be used.

The developing roller 41 is disposed to face the photosensitive drum 1 and be in contact therewith in the development portion and is driven to rotate at a predetermined speed. The developing roller 41 in the present example is in contact with the photosensitive drum 1 at all times while the process cartridge 10 is mounted on the main body of the image forming apparatus 100, even when no image is formed. That is, the image forming apparatus 100 is not provided with an abutment/separation mechanism for separating the developing roller 41 from the photosensitive drum 1.

The supply roller 42 rotates in contact with the developing roller 41 and supplies the toner 44. The developing blade 43 is an elastic member and is bent against elasticity and arranged in contact with the developing roller 41. The stirring member 45 rotates at a predetermined speed in conjunction with the rotation of the developing roller 41 to stir the developer 44 in the developer container 4 and supply the toner 44 to the supply roller 42.

The toner 44 is borne on the developing roller 41 and is also caused by the developing blade 43 to form a layer of a predetermined thickness and conveyed to the development portion facing the photosensitive drum 1. In the present example, the developing roller 41 rotates at a speed 1.4 times the surface movement speed of the photosensitive drum 1. A predetermined developing voltage is applied to the developing roller 41 by a developing voltage applying portion provided in the image forming apparatus 100, thereby developing the electrostatic latent image. A DC high-voltage power supply was used as the output source of the developing voltage.

A fixing portion 6 is of a heat fixing type that fixes the image by heating and melting the toner on the recording material P. The fixing portion 6 includes a fixing film, a fixing heater such as a ceramic heater that heats the fixing film, a thermistor that measures the temperature of the fixing heater, and a pressure roller that presses against the fixing film.

Explanation of Image Forming Apparatus System Configuration

Figure 13:
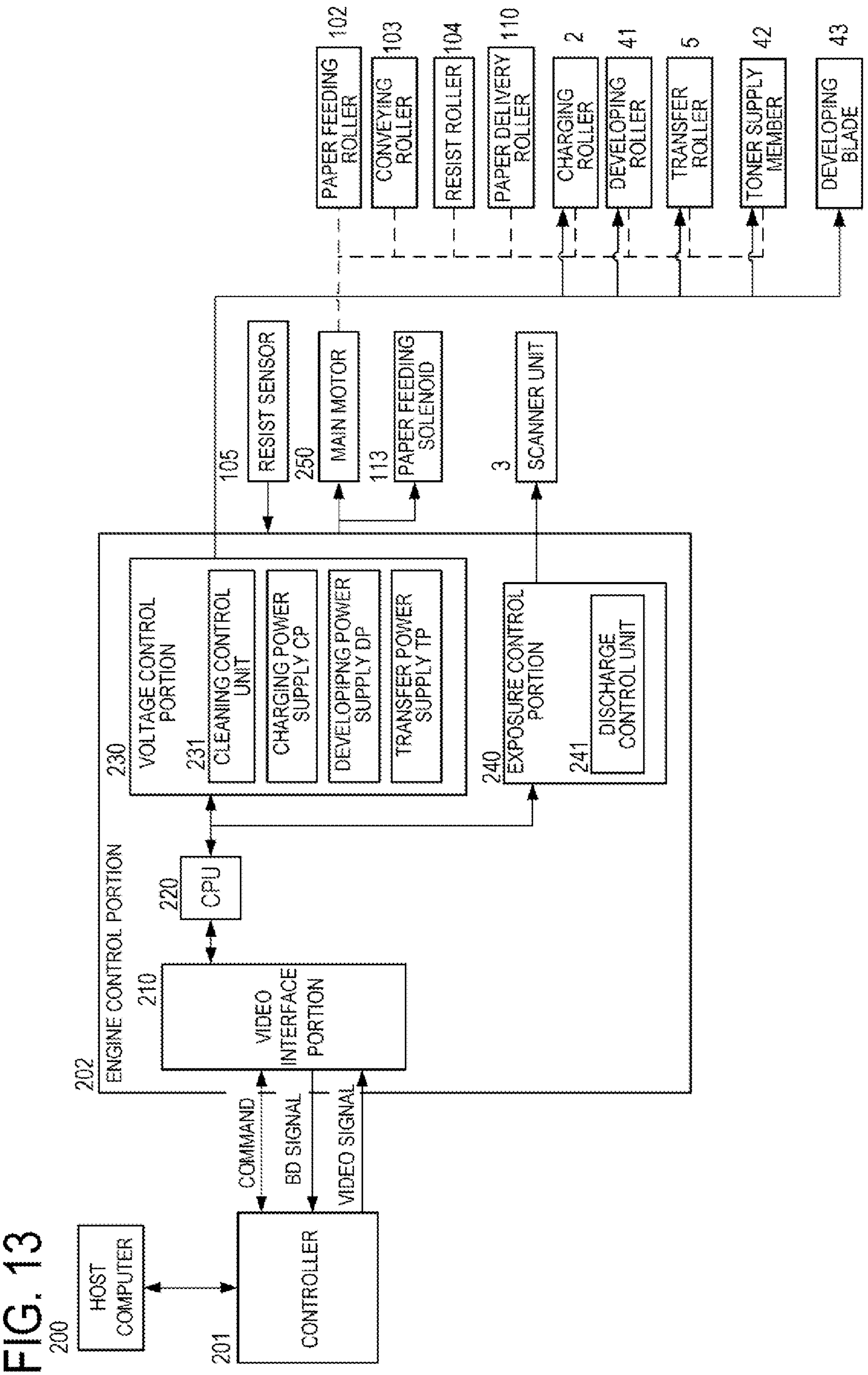
FIG. 13 is a system configuration diagram of the image forming apparatus.

The system configuration of the image forming apparatus 100 according to the present example will be explained using FIG. 13. A controller 201 is capable of communicating with a host computer 200 and an engine control portion 202. Where print data are input from the host computer 200, the controller 201 develops the print data and converts it into image data for image formation. Then, an exposure video signal is generated for exposure based on the image data. When the generation of the video signal is completed, the controller 201 instructs a video interface portion 210 of an engine control portion 202 to start forming an image using a command. After that, when an instruction to start image formation is received from the video interface portion 210, CPU 220 starts various actuators such as the main motor 250 and starts preparing for image formation. When the preparation for image formation is completed, the engine control portion 202 starts outputting a/BD signal, which is the reference timing for outputting the video signal, to the controller 201, and sequentially executes the above-described image forming operations.

The engine control portion 202 controls the conveyance of the recording material P by starting the main motor 250 as a drive source during the image forming operation and driving each roller involved in conveying the recording material P. The rollers involved in conveying the recording material P include a paper feeding roller 102, a conveying roller 103, a resist roller 104, a transfer roller 5, a paper delivery roller 110, and the like. A resist sensor 105 measures the paper interval during continuous paper feeding (when printing continuously on a plurality of recording materials P) on the basis of detection timing of the leading edge and trailing edge of the recording material P as the recording material P is conveyed. The engine control portion 202 determines the next paper feed timing from, for example, the paper length and the paper interval, drives a paper feeding solenoid 113 at the determined paper feed timing, and feeds the next recording material P.

Figure 14:
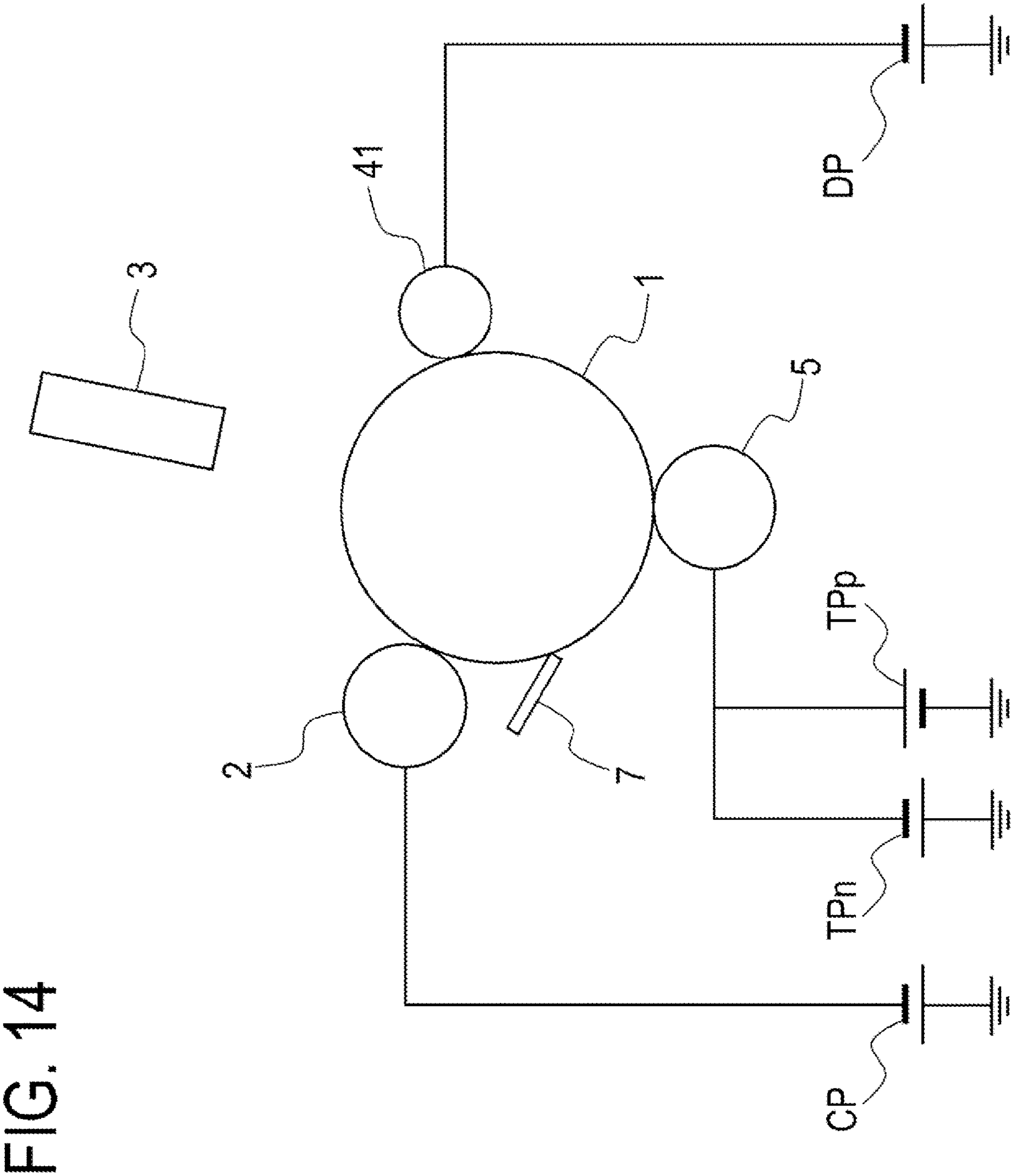
FIG. 14 is a schematic diagram of a voltage application configuration.

The voltage control portion 230 is configured to be capable of controlling voltage application to the charging roller 2, developing roller 41, transfer roller 5, supply roller 42, and developing blade 43. As shown in FIG. 14, the voltage control portion 230 is configured to be capable of applying a voltage of negative polarity to the charging roller 2 from a high-voltage power supply CP for applying a charging voltage (charging voltage applying portion). Further, the voltage control portion 230 is configured to be capable of applying a voltage of negative polarity to the developing roller 41 from a high-voltage power supply DP for applying a developing voltage (developing voltage applying portion). Further, the voltage control portion 230 is configured (transfer voltage applying portion) to be capable of applying a voltage of positive polarity to the transfer roller 5 from a high-voltage power supply TPp for applying a transfer voltage (positive voltage applying portion) and applying a voltage of negative polarity to the transfer roller 5 from a power supply TPn for applying a non-transfer voltage (negative voltage applying portion). The polarities of these voltages are based on the premise that the normal charging polarity of the toner is negative. Therefore, it goes without saying that when the normal charging polarity of the toner is positive, the polarities of the voltages described above are reversed.

When cleaning the charging roller, a cleaning control unit 231 applies a voltage of positive polarity and a voltage of negative polarity with respect to the charging potential of the photosensitive drum 1 to the charging roller 2 at predetermined timings. By applying a voltage of positive polarity and a voltage of negative polarity to the charging roller 2, the adhering matter (including the external additive etc. of the toner) on the charging roller 2 is transferred to the photosensitive drum 1 and cleaning is performed regardless of the charge polarity thereof.

In the present example, the charging voltage applying portion is configured to include only a power supply CP that applies a voltage of negative polarity. Therefore, the application of a voltage of positive polarity with respect to the charge potential of the photosensitive drum 1 to the charging roller 2 is replaced by not applying any voltage to the charging roller 2. That is, by setting the potential of the charging roller 2 to 0 V, the potential of the charging roller 2 is controlled to the positive polarity side with respect to the surface potential of negative polarity of the photosensitive drum 1. A configuration for applying a voltage of positive polarity may be added to the charging voltage applying portion.

In the following explanation, the time required for the voltage to rise and fall when the voltage control portion 230 applies voltage to the charging roller 2, developing roller 41, and transfer roller 5 and when the voltage application is stopped will not be considered to simplify the explanation.

The exposure control portion 240 is configured to make settings for the scanner unit 3 and to be capable of exposing the photosensitive drum 1 with a predetermined light quantity. During toner purge, a discharge control unit 241 can form a toner image by exposing the photosensitive drum 1 to a predetermined light quantity and at a predetermined timing and can send the formed toner image to a cleaning blade 7 as a cleaning member.

The relative arrangement of each member around the circumferential surface of the rotating photosensitive drum 1 will be explained hereinbelow. The position around the circumferential surface of the rotating photosensitive drum 1 where the photosensitive drum 1 and the charging roller 2 abut against each other is defined as a charging position (charging portion (a)). An exposure position (scan exposure portion (b)) which is irradiated by laser light emitted from the scanner unit 3 is formed downstream of this charging position in the direction of the photosensitive drum 1 around the circumferential surface of the photosensitive drum 1. A development nip portion (development portion (c)) where the photosensitive drum 1 and the developing roller 41 come into contact with each other is formed downstream of this exposure position in the rotation direction of the photosensitive drum 1 around the circumferential surface of the photosensitive drum 1 (in a non-contact development type of device, it is the opposing portion). A transfer nip portion where the photosensitive drum 1 and the transfer roller 5 come into contact with each other is formed downstream of the position (development position) where this development nip is formed in the rotation direction of the photosensitive drum 1 around the circumferential surface of the photosensitive drum 1. An abutment portion (cleaning position, cleaning portion) where the cleaning blade 7 abuts against the photosensitive drum 1 is formed downstream of the position (transfer position) where the transfer nip is formed in the rotation direction of the photosensitive drum 1 around the circumferential surface of the photosensitive drum 1, and upstream of the charging position.

The image forming operation of the image forming apparatus 100 will be described hereinbelow. Where an image forming command is input to the image forming apparatus 100, the image forming unit starts an image forming process on the basis of image information input from an external host computer 200 or a reading device connected to the image forming apparatus 100. By driving a paper feed solenoid 113, the topmost sheet of the bundle of recording materials P is fed from a cassette by the paper feeding roller 102, and is conveyed by the conveying roller 103 and the resist roller 104. The leading edge and trailing edge of the conveyed recording material P are detected by the resist sensor 105 installed on the conveyance path. The scanner unit 3 irradiates the photosensitive drum 1 with laser light based on the input image information. At this time, the photosensitive drum 1 is charged in advance by the charging roller 2, and an electrostatic latent image is formed on the photosensitive drum 1 as a result of irradiation with the laser light. Thereafter, this electrostatic latent image is developed by the developing roller 41, and a toner image is formed on the photosensitive drum 1.

A transfer voltage is applied from the transfer high-voltage power supply TPp to the transfer roller 5 as a transfer member, and the toner image borne on the photosensitive drum 1 is transferred onto the recording material P conveyed by the resist roller pair. The recording material P onto which the toner image has been transferred is conveyed to the fixing portion 6, and the toner image is heated and pressed when passing through the nip between the fixing film of the fixing portion 6 and the pressure roller. As a result, the toner particles are melted and then fixed, thereby fixing the toner image on the recording material P. The recording material P that has passed through the fixing portion 6 is detected by a fixing paper delivery sensor 109, and is delivered to the outside of the image forming apparatus 100 (outside the machine) by a paper delivery roller 110 as a delivery member and loaded onto a discharge tray which serves as a loading portion formed on the upper part of the printer main body.

Next, the potential relationship around the photosensitive drum 1 in the image forming process of the present example will be explained.

1. Potential Relationship Around the Photosensitive Drum

In the present example, the surface of the photosensitive drum 1, which is charged to a uniform charging potential Vd (dark area potential: −550 V) by the charging roller 21 to which a charging voltage of −1140 V has been applied, is exposed to light for image formation. The exposure amount and exposure area are determined according to the image signal. The image formation portion is exposed to light by the scanner unit 3, and adjusted to a post-exposure potential Vl (light area potential: −170 V), which is the image area potential. The exposure amount E0 to form this Vl was set to 0.24 $\mu J/cm^2$.

Figure 15A:
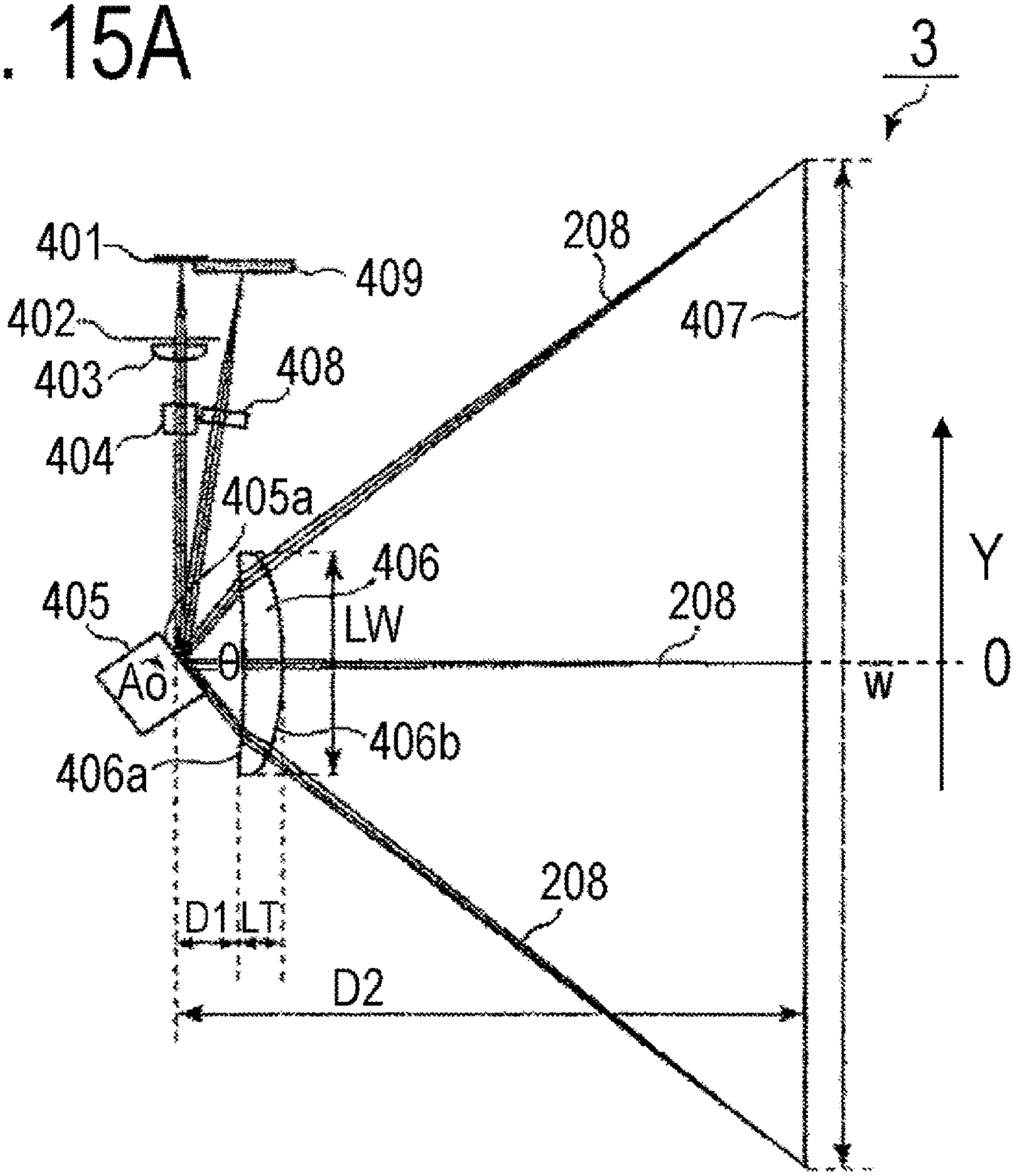
FIGS. 15A and 15B are explanatory diagrams of the configuration of a scanner unit in Example 1.
Figure 15B:
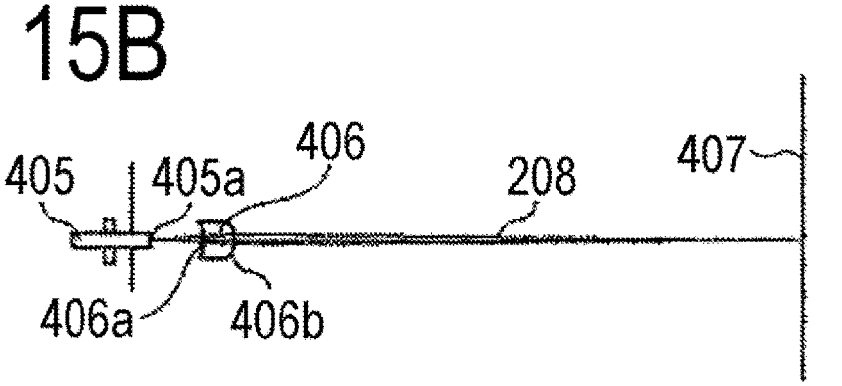

Here, the scanner unit 3 in the present example will be explained. FIGS. 15A and 15B are configuration diagrams of the scanner unit 3 of the present example, with FIG. 15A showing a cross-sectional view in the main scanning direction and FIG. 15B showing a cross-sectional view in the sub-scanning direction. The main scanning direction is a direction parallel to the surface of the photosensitive drum 1 and perpendicular to the movement direction of the surface of the photosensitive drum 1. Further, the sub-scanning direction is the movement direction of the surface of the photosensitive drum 1.

A laser beam 208 emitted from a light source 401 is shaped into an elliptical form by an aperture 402 and falls on a coupling lens 403. The laser beam 208 that has passed through the coupling lens 403 is converted into a substantially parallel light beam and falls on an anamorphic lens 404. The substantially parallel light beam is inclusive of a weakly convergent light beam and a weakly diverging light beam. The anamorphic lens 404 has a positive refractive power within the main scanning cross-section, and converts the incident light beam into a convergent light beam within the main scanning cross-section. Further, the anamorphic lens 404 focuses the light flux near a reflective surface 405*a* of a deflector (polygon mirror) 405 within the sub-scanning cross-section, and forms a long linear image in the main scanning direction.

Then, the light flux that has passed through the anamorphic lens 404 is reflected by the reflective surface 405*a* of the deflector 405. The laser beam 208 reflected by the reflective surface 405*a* passes through an imaging lens 406, forms an image on the surface of the photosensitive drum 1 and forms a predetermined spot-shaped image (hereinafter referred to as a spot). As a result of rotating the deflector 405 at a constant angular velocity in the direction of arrow Ao by a drive unit (not shown), the spot moves in the main scanning direction on a surface 407 to be scanned of the photosensitive drum 1, and an electrostatic latent image is formed on the surface 407.

A beam detect (hereinafter referred to as BD) sensor 409 and a BD lens 408 constitute a synchronization optical system that determines the timing of writing an electrostatic latent image on the surface 407 to be scanned. The laser beam 208 that has passed through the BD lens 408 falls on the BD sensor 409 including a photodiode and is detected. The writing timing is controlled based on the timing at which the laser beam 208 is detected by the BD sensor 409. Although the light source 401 of the present example has one light emitting unit, the light source 401 may include a plurality of light emitting units for which light emission can be independently controlled.

As shown in FIGS. 15A and 15B, the imaging lens 406 has two optical surfaces (lens surfaces): an entrance surface 406*a* and an exit surface 406*b*. The imaging lens 406 is configured such that a light flux deflected by the reflective surface 405*a* scans a surface 407 to be scanned with desired scanning characteristics in the main scanning section. Further, the imaging lens 406 is configured to form a spot of the laser beam 208 on the surface 407 into a desired shape.

The imaging lens 406 of the present example does not have the so-called fθ characteristic. In other words, when the deflector 405 rotates at a constant angular velocity, it does not have a scanning characteristic that causes the spot of the light beam passing through the imaging lens 406 to move at a constant velocity on the surface 407 to be scanned. In this way, by using the imaging lens 406 that does not have the fθ characteristic, it becomes possible to arrange the imaging lens 406 close to the deflector 405. That is, the deflector 405 can be arranged at a position where the distance D1 shown in FIGS. 15A and 15B is small. Furthermore, the imaging lens 406 that does not have the fθ characteristic can be made smaller in the main scanning direction (width LW) and optical axis direction (thickness LT), as shown in FIGS. 15A and 15B, than the imaging lens that has the fθ characteristic. Therefore, the housing of the optical scanning device 400 can be made smaller. Further, in the case of a lens having the fθ characteristic, there may be a sharp change in the shape of the entrance surface and exit surface of the lens when viewed in the main scanning cross-section. Therefore, if there are restrictions on the shape, there is a possibility that good imaging performance cannot be obtained. Meanwhile, since the imaging lens 406 does not have the fθ characteristic, there are few sharp changes in the shape of the entrance surface and exit surface of the lens when viewed in the main scanning cross section, which makes it possible to achieve good imaging performance.

The scanning characteristic of the imaging lens 406 according to the present example is expressed by the following equation (1).

[Math. 1]

$$Y = \frac{K}{B}\tan B\theta \ldots \quad \text{Equation (1)}$$

In equation (1), θ is the scanning angle (scanning angle of view) of the deflector 405, Y [mm] is the focusing position (image height) in the main scanning direction of the light flux on the surface 407 to be scanned, K [mm] is the imaging coefficient at an on-axis image height, and B is the coefficient (scanning characteristic coefficient) that determines the scanning characteristic of the imaging lens 406. In the present example, the on-axis image height refers to the image height on the optical axis (Y=0=Ymin), and corresponds to the scanning angle θ=0. That is, in the present example, the on-axis image height is located at the center in the longitudinal direction of the photosensitive drum 1 in the main scanning direction. Further, an off-axis image height refers to the image height (Y≠0) outside the central optical axis (when the scanning angle θ=0), and corresponds to the scanning angle θ≠0. Furthermore, the most-off-axis image height refers to the image height (Y=+Ymax, −Ymax) when the scanning angle θ is at maximum (maximum scanning angle of view). The scanning width W, which is the width in the main scanning direction of a predetermined area (scanning area) in which a latent image can be formed on the surface 407 to be scanned, is expressed as W=|+Ymax|+|−Ymax|. That is, the central part of the predetermined region of the photosensitive drum 1 is the on-axis image height, and the end part is the most-off-axis image height.

Here, the imaging coefficient K corresponds to f in the scanning characteristic (fθ characteristic) Y=fθ when parallel light is incident on the imaging lens 406. That is, the imaging coefficient K is a coefficient for setting the proportional relationship between the focusing position Y and the scanning angle θ, similarly to the fθ characteristic, when a light flux other than parallel light is incident on the imaging lens 406.

To add more information about the scanning characteristic coefficient, when B=0, equation (1) becomes Y=Kθ which corresponds to the scanning characteristic Y=fθ of an imaging lens used in the conventional optical scanning device. Furthermore, when B=1, equation (1) becomes Y=K tan θ and, therefore, corresponds to the projection characteristic Y=f tan θ of a lens used in an imaging device (generally a camera) or the like. That is, by setting the scanning characteristic coefficient B in the range of 0≤B≤1 in equation (1), it is possible to obtain a scanning characteristic between the projection characteristic Y=f tan θ and the fθ characteristic Y=fθ.

Here, where the derivative of equation (1) is taken with respect to the scanning angle θ, the scanning speed of the light flux on the scanned surface 407 for the scanning angle θ is obtained as shown in equation (2).

[Math. 2]

$$\frac{dY}{d\theta} = \frac{K}{\cos^2 B\theta} \ldots \quad \text{Equation (2)}$$

Furthermore, where equation (2) is transformed, it becomes as shown in equation (3).

[Math. 3]

$$\frac{\frac{dY}{d\theta}}{K} - 1 = \frac{1}{\cos^2 B\theta} - 1 = \tan^2 B\theta \ldots \quad \text{Equation (3)}$$

Equation (3) represents the amount of deviation (partial magnification) in the scanning speed of each off-axis image height with respect to the scanning speed of the on-axis image height. In the optical scanning device 400 according to the present example, the scanning speed of the light flux differs between the on-axis image height and the off-axis image height, except when B=0.

Figure 16:
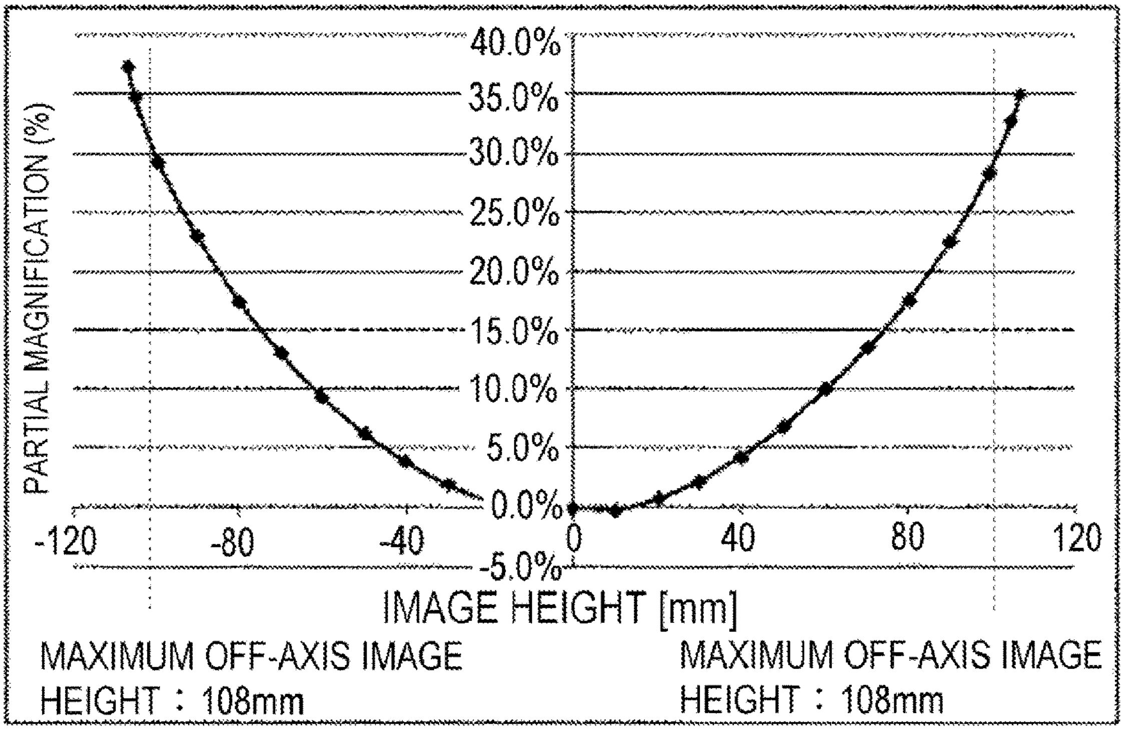
FIG. 16 is a diagram showing the relationship between image height and partial magnification.

FIG. 16 shows the relationship between the image height and the partial magnification when the scanning position on the surface 407 to be scanned according to the present embodiment is fitted with the characteristic of Y=Kθ. In the present embodiment, as a result of providing the imaging lens 406 with the scanning characteristic shown in equation (1), the partial magnification increases because the scanning speed gradually increases with the transition from the on-axis image height to the off-axis image height as shown in FIG. 16. For example, a partial magnification of 30% means that when irradiation with light is performed for a unit time, the irradiation length at the off-axis image height in the main scanning direction on the surface 407 to be scanned is 1.3 times that at the on-axis image height. In the example of FIG. 16, the scanning speed at the on-axis image height is the lowest, and the scanning speed becomes higher as the absolute value of the image height becomes larger. Therefore, where the pixel width in the main scanning direction is determined at constant time intervals determined by the clock cycle, the pixel density will differ between the on-axis image height and the off-axis image height. Accordingly, in the present example, partial magnification correction is performed. Specifically, the clock frequency is adjusted according to the image height so that the pixel width is substantially constant regardless of the image height.

In this example, as shown in FIGS. 15A and 15B, the distance from the point on the deflector 405 where the laser beam 208 is reflected to the surface to be scanned is D2=130 mm, W=216 mm, and the distance to the most off-axis image height becomes W/2=108 mm. Therefore, as shown in FIG. 16, at the most-off-axis image height in this example, the partial magnification Dmax is 30%. At this time, B=0.734. The maximum value of the scanning angle θ is 40°.

Furthermore, the time required to scan a unit length when the image height on the surface 407 to be scanned is near the most-off-axis image height is shorter than the time required to scan a unit length when the image height is near the on-axis image height. This means that when the light emission brightness of the light source 401 is constant, the exposure amount (Ee) per unit length when the image height is near the most-off-axis image height becomes smaller than the exposure amount (Ec) per unit length when the image height is near the on-axis image height. In other words, the exposure amount of the laser beam 208 that reaches the on-axis image height region of the photosensitive drum 1 in the axial direction of the photosensitive drum 1 is different from the exposure amount of the laser beam 208 that reaches the most-off-axis image height region. Er=Ec/Ee, which is the ratio between Ec and Ee, has a value substantially close to Dmax+100%, so Er=Dmax+100%=130%. This means that the light quantity near the on-axis image height is 30% higher than the light quantity near the most-off-axis image height.

Figure 12:
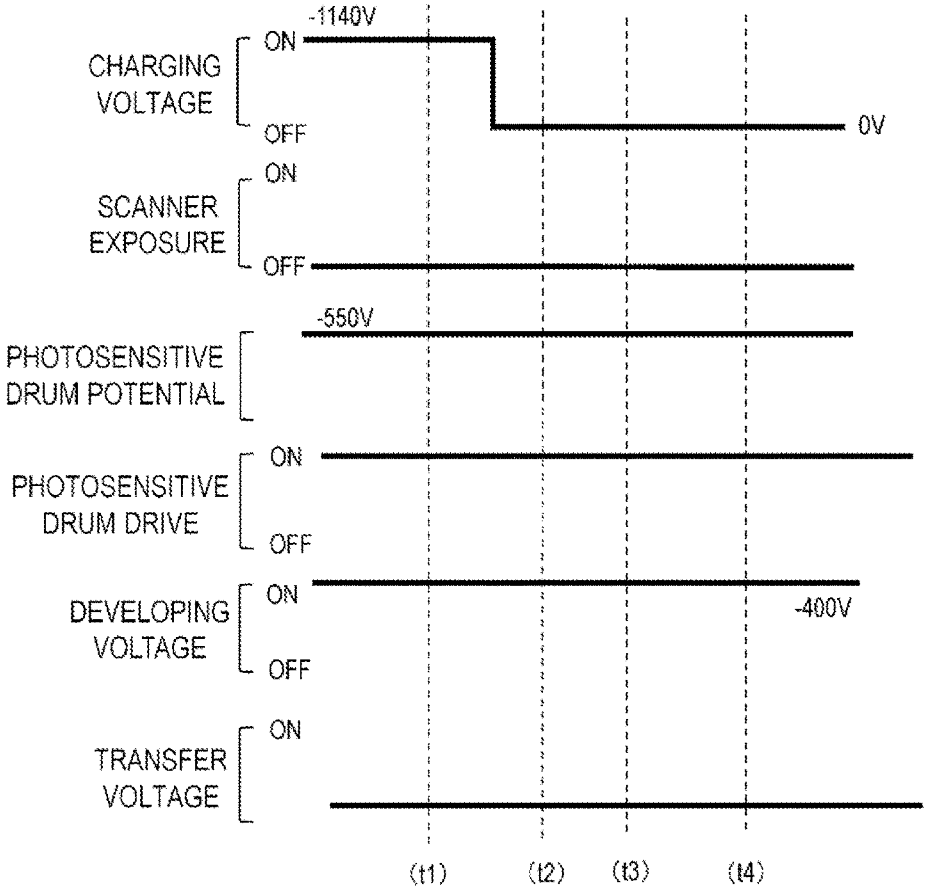
FIG. 12 is a sequence chart of the development and collection sequence operation in Comparative Example 2.
Figures 17A, 17B:
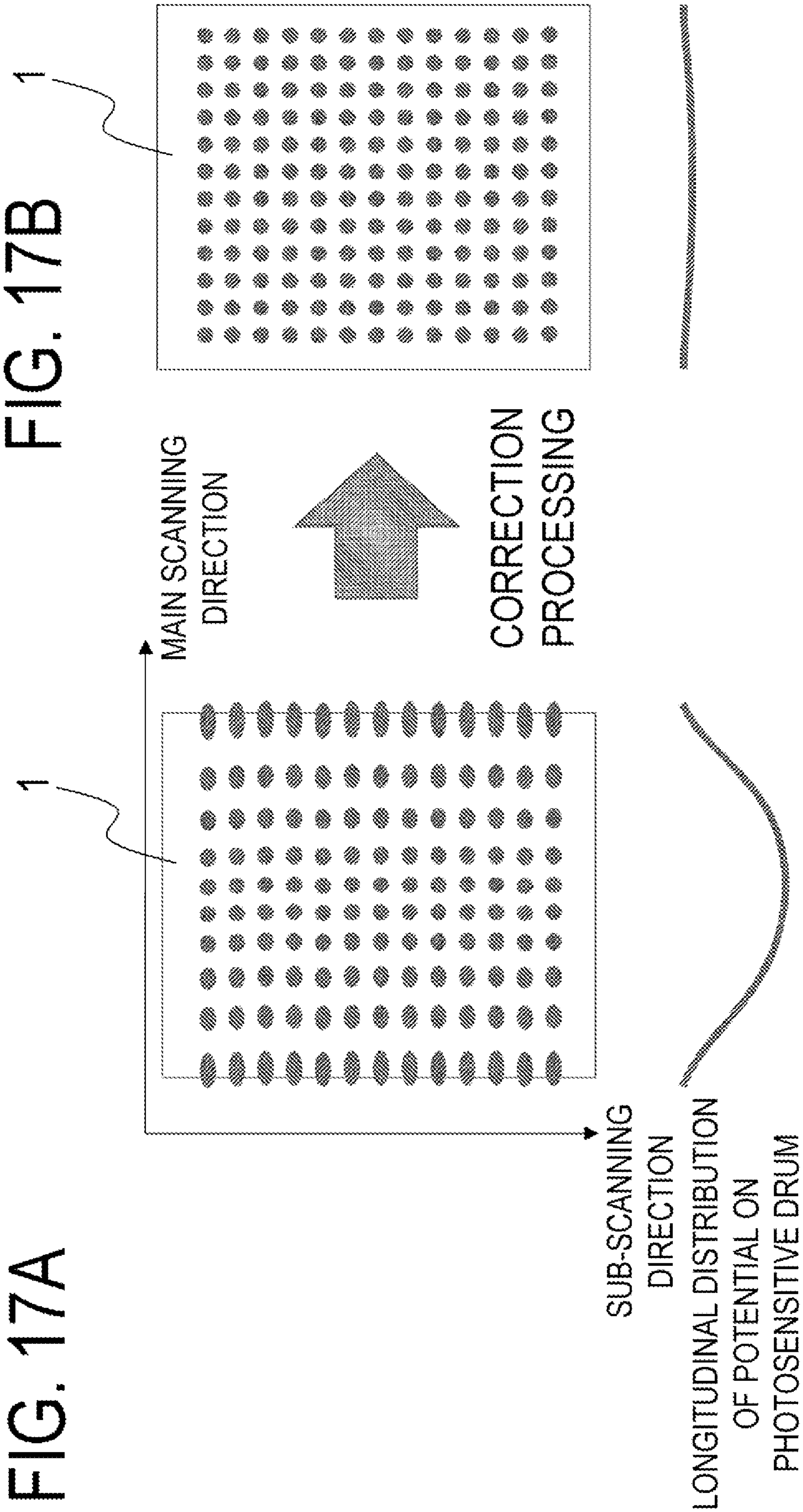
FIGS. 17A and 17B are diagrams of exposure images of a photosensitive drum surface before and after a correction process.

As described above, in the present example, a micro scanner is used without the fθ lens of the scanner laser, and the size and interval of the unit dots exposed on the photosensitive drum differ in the main scanning direction of the scanner laser. Compared to the end portions of the photosensitive drum, the size of one dot is smaller at the center, and the dot spacing is also smaller. Therefore, if no correction is performed, the surface potential of the photosensitive drum formed after exposure will be lower at the center than at the ends. Accordingly, in the present example, as shown in FIG. 12, correction processing is performed on the dot spacing and shape so that the surface potential of the photosensitive drum after exposure during image formation has the same value at the center and at the ends. FIG. 17A is an exposure image of the surface of the photosensitive drum 1 before the correction process, and FIG. 17B is an exposure image of the surface of the photosensitive drum 1 after the correction process. Through this processing, the photosensitive drum surface potential is uniformly controlled to −170 V in the main scanning direction of the scanner laser with the exposure amount E0=0.24 μJ/cm$^2$ as described above.

A developing voltage Vdc (developing potential: −400 V) is applied to the developing roller 41 that develops a toner image with respect to the light area potential Vl on the photosensitive drum 1. An image formation portion and a non-image formation portion, which will be described hereinbelow, are formed within a region where an image can be formed on the surface of the photosensitive drum 1. The region where an image can be formed is a region where the toner 44 can be supplied from the developing roller 41 to the surface of the photosensitive drum 1, and is a region where the toner 44 can be borne on the surface of the developing roller 41.

In other words, the development contrast Vcont, which is the potential difference (absolute value) between the light area potential Vl on the photosensitive drum 1 and the developing voltage Vdc of the image formation portion, is 230 V, and the back contrast Vbc, which is the potential difference (absolute value) between the dark area potential Vd on the photosensitive drum 1 and the developing voltage Vdc, is 150 V. This makes it possible to appropriately output images such as solid black images, halftones, and white characters.

Here, the surface of the photosensitive drum 1 and the developing voltage that form the development contrast Vcont and the back contrast Vbc are expressed as the potential difference between the surface potential of the photosensitive drum 1 in the development portion and the developing voltage applied to the developing roller 41. If image formation is performed without appropriate potential setting, image defects will occur on the recording material P. Specifically, where the development contrast Vcont is small, the amount of toner developed on the photosensitive drum 1 decreases, resulting in low density, and where the development contrast Vcont is large, the amount of toner developed on the photosensitive drum 1 increases, resulting in poor fixing. Therefore, the development contrast Vcont needs to be adjusted appropriately in consideration of these factors.

Further, the voltage in this example is expressed as a potential difference with a ground potential (0 V). Therefore, the developing voltage Vdc=−400 V is interpreted as having a potential difference of −400 V with respect to the ground potential due to the developing voltage applied to the core metal of the developing roller 41. This also applies to charging voltage and the like.

2. Positive External Additive and Fogging

Next, the reason for externally adding a positive external additive to the toner will be explained. The positive external additive refers to an external additive that has a positive charging ability that is opposite to the toner that has a negative charging ability as a normal polarity. The positive external additive is released from the toner surface by the image forming operation and adheres to the surface of a member such as the developing roller. Since the positive external additive that has adhered to the member surface has a negative charge-providing ability with respect to the toner, the negative charge quantity of the toner can be appropriately controlled. By achieving the appropriate negative charge quantity of the toner, excess toner is prevented from adhering to the non-image formation portion (white background portion), which is the portion where no image formation is performed. This excess toner is called fogging toner, and the phenomenon in which fogging toner occurs is called fogging. Where fogging occurs, toner adheres to areas other than those where an image is originally intended to be formed, causing a tinge in the white background area, which may be disadvantageous to the user.

The amount of fogging toner was measured by transferring the toner present on the photosensitive drum 1 to a Mylar tape by taping, pasting the tape onto reference paper, and measuring the density thereof using a reflection densitometer (TC-6DS/A) manufactured by Tokyo Denshoku Co., Ltd. The amount of fogging toner was calculated from the amount of toner on the photosensitive drum 1 when image formation operation was performed using the image forming apparatus 100 and development was carried out by changing a back contrast Vbc without using the recording material P. Where the amount of fogging toner is less than a certain value, the fogging toner will not be visually recognized, so there will be no problem with the image, but where the amount of fogging toner increases, the fogging toner will become visible and will be an image defect.

3. Decrease in Amount of Positive External Additive in Developer Container

In this example, fine strontium titanate powder having a number-average particle size of primary particle of 30 nm to 300 nm was used as a positive external additive by uniformly adhering the powder to the surface of the toner. As for the method for producing strontium titanate fine powder, for example, the method disclosed in Japanese Patent Application Publication No. 2022-092546 and the like may be used as appropriate. Since strontium titanate itself has a positive charging ability with respect to the developer, when strontium titanate is released from the toner, it is easily supplied as a separated external additive to the non-printing portion on the photosensitive drum. In long-term use in a low-printed image mode, the separated external additive is consumed in a larger amount than the toner from inside the developer container 4, and the ratio of the positive external additive to the toner inside the developer container 4 decreases. This reduces the negative charge quantity of the toner, causing image defects such as fogging.

4. Adhesion of Positive External Additive to Charging Roller

Furthermore, in the transfer portion, the external additive that has adhered to the non-printing portion receives positive discharge due to the transfer voltage, and the positive charge quantity increases. As a result, the external additive exerts a strong electrostatic attraction force on the surface of the photosensitive drum 1. Normally, this external additive is scraped off by the cleaning blade 7 and accommodated in a waste toner container. Meanwhile, in long-term use at a low print percentage, a layer (blocking layer) in which toner and external additive have accumulated is less likely to be formed at the tip of the cleaning blade 7. By continuing to rotate the photosensitive drum 1 in a state where this blocking layer is small, a frictional force between the photosensitive drum 1 and the cleaning blade 7 increases. As the cleaning blade 7 vibrates minutely, the external additive contained in the blocking layer slips through the cleaning blade 7. Since the external additive that has slipped through the cleaning blade 7 is positively charged, an electrostatic force acts on the external additive in the direction toward the charging roller 2 to which a high negative charging voltage was applied with respect to the photosensitive drum 1, and the external additive migrates from the photosensitive drum 1 to the surface of the charging roller 2. As a result, the positive external additive that has migrated to the photosensitive drum 1 in the development portion during the long-term use migrates to the charging roller 2 and accumulates thereon.

Supply of External Additive

In order to prevent the external additive from slipping through the cleaning blade 7, a developer is developed on the photosensitive drum 1 during non-image formation to form a blocking layer, and the developer is actively supplied to the tip of the cleaning blade 7 (toner purge). However, when a printing operation is performed for a long period of time, it is difficult to completely prevent the external additive from slipping through the cleaning blade 7, and the positively charged external additive adheres to the charging roller 2 and accumulates thereon.

Figure 2:
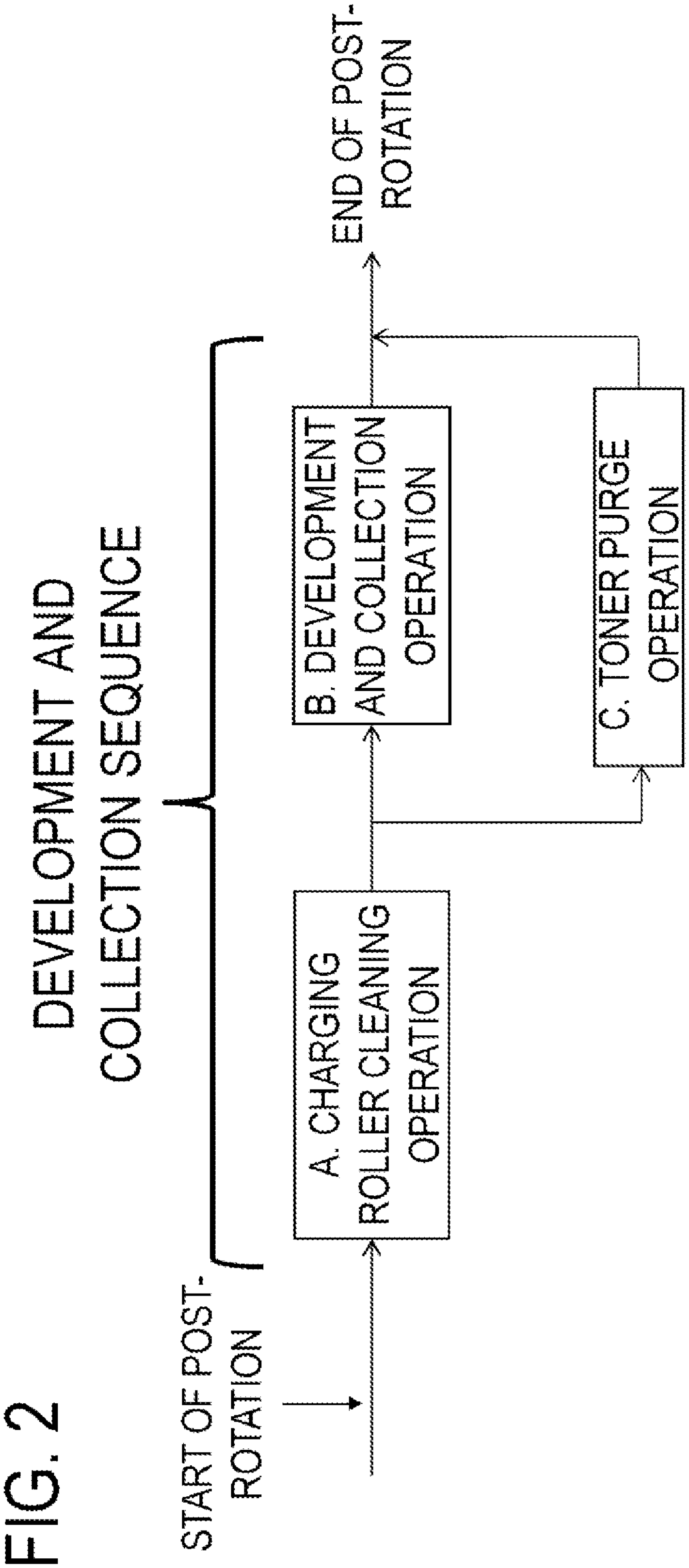
FIG. 2 is a schematic diagram of a development and collection sequence operation in Example 1.

In the present example, as shown in FIG. 2, in the post-rotation operation after the image forming operation, a sequence operation of developing and collecting the positive external additive that has adhered to the charging roller 2 (development and collection sequence) is implemented together with the implementation of the abovementioned toner purge performed for forming a blocking layer. Here, the post-rotation operation is an operation in which the main motor (drive motor) 250 continues to be driven for a predetermined period of time even after the image forming operation for a predetermined sheet or a predetermined number of sheets is completed, and a predetermined sequence operation is executed as the photosensitive drum 1 is rotationally driven. In the present example, the development and collection sequence is performed during the post-rotation for each surface movement distance of the developing roller 41 when printing one job, which corresponds to passing two letter papers and passing 100 sheets. The development and collection sequence may be performed during each post-rotation operation. This is because the toner on the developing roller 41 migrates to the photosensitive drum 1 as fogging toner in the process in which the developing roller 41 abuts against the photosensitive drum 1 and rotational operation is performed, and the total amount of the fogging toner is correlated with the surface movement distance of the developing roller 41. The fogging toner that has migrated onto the photosensitive drum 1 is mainly supplied to the tip of the cleaning blade 7, but a very small amount of it slips through the cleaning blade 7 and adheres to the charging roller 2. Studies have shown that the measured amount of external additive adhered to the charging roller 2 increases depending on the surface movement distance of the developing roller 41. For this reason, the development and collection sequence is performed at a timing when the surface movement distance of the developing roller 41 reaches a certain fixed distance, and the positive external additive that has adhered to the charging roller 2 is transferred from the charging roller 2 to the photosensitive drum 1, developed and collected.

5. Control in Development and Collection Sequence

Figure 3:
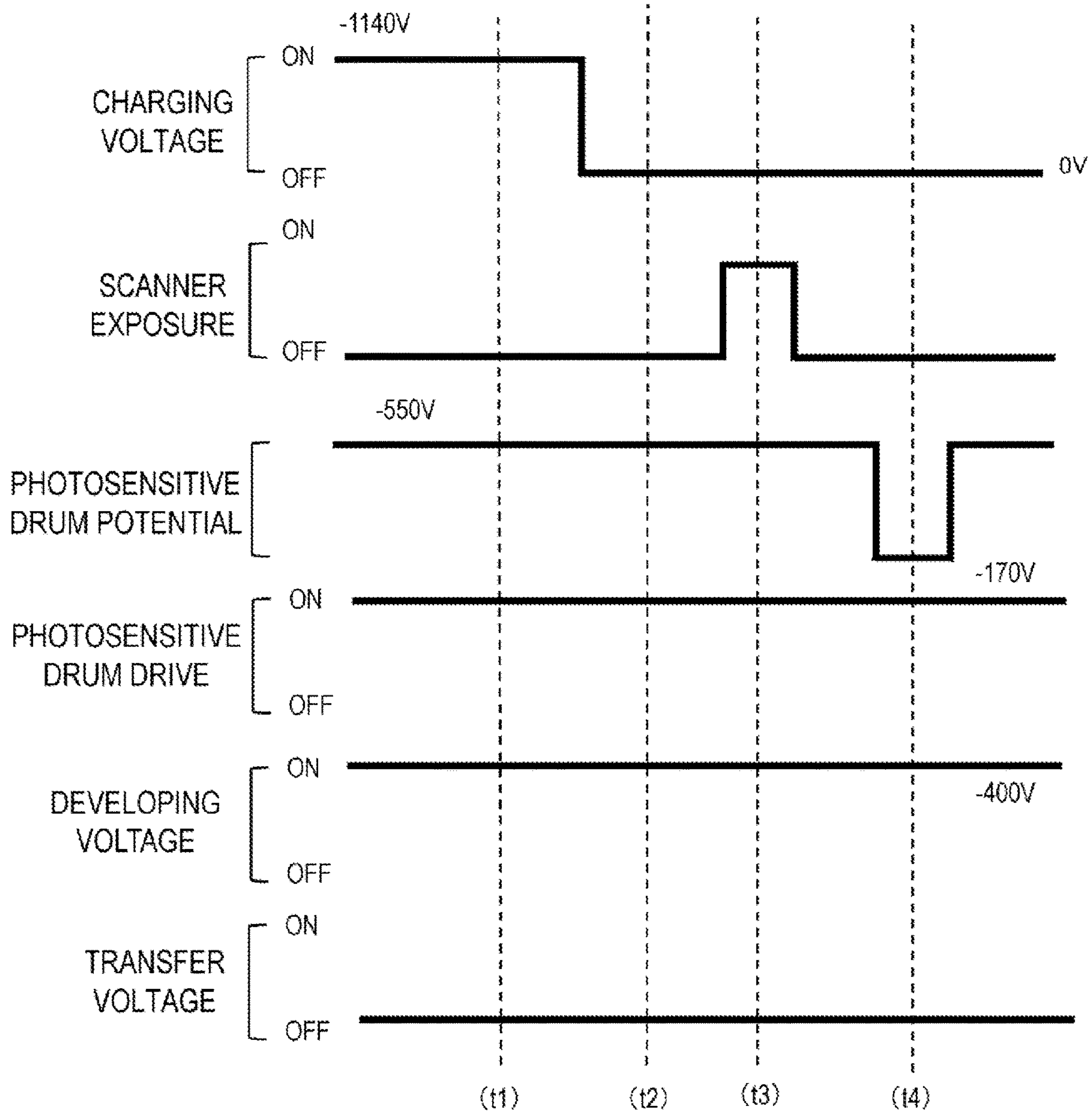
FIG. 3 is a sequence chart of the development and collection sequence operation in Example 1.
Figure 4:
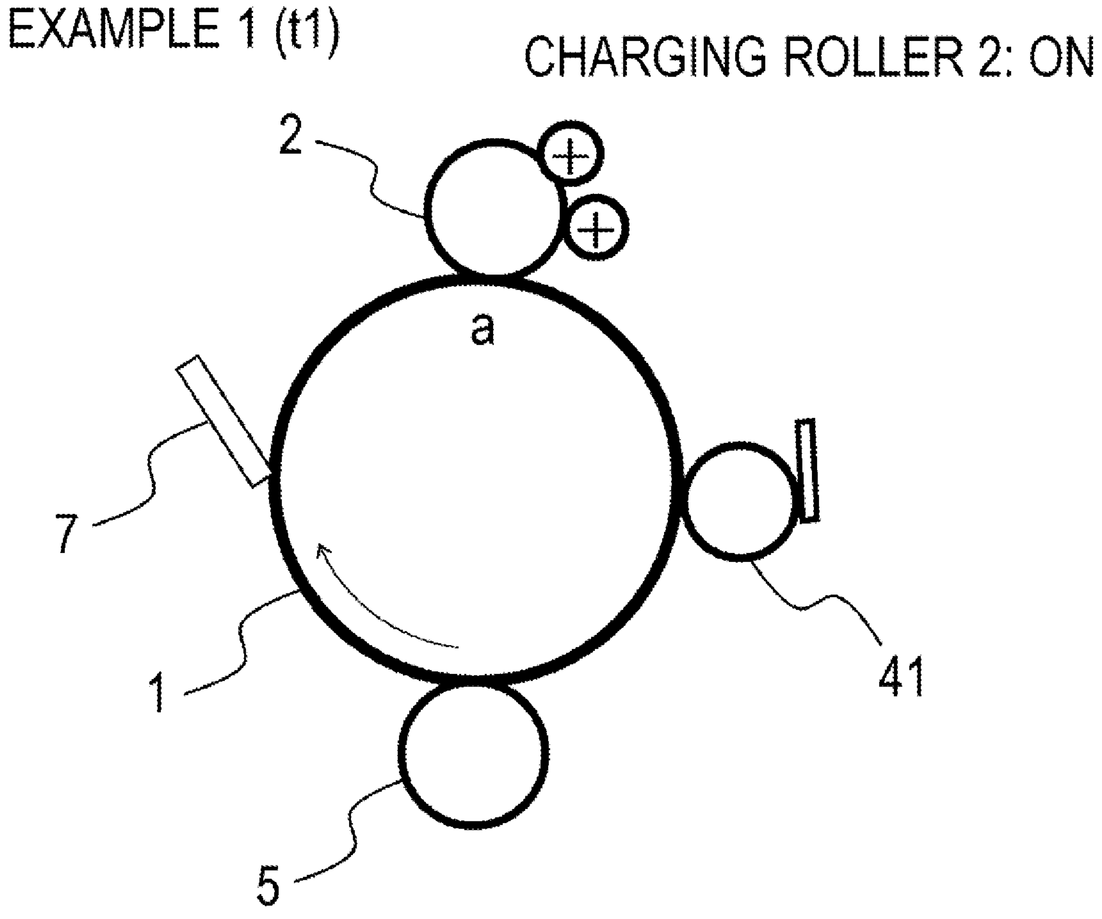
FIG. 4 is a schematic diagram of a process unit at (t1) in Example 1.
Figure 5:
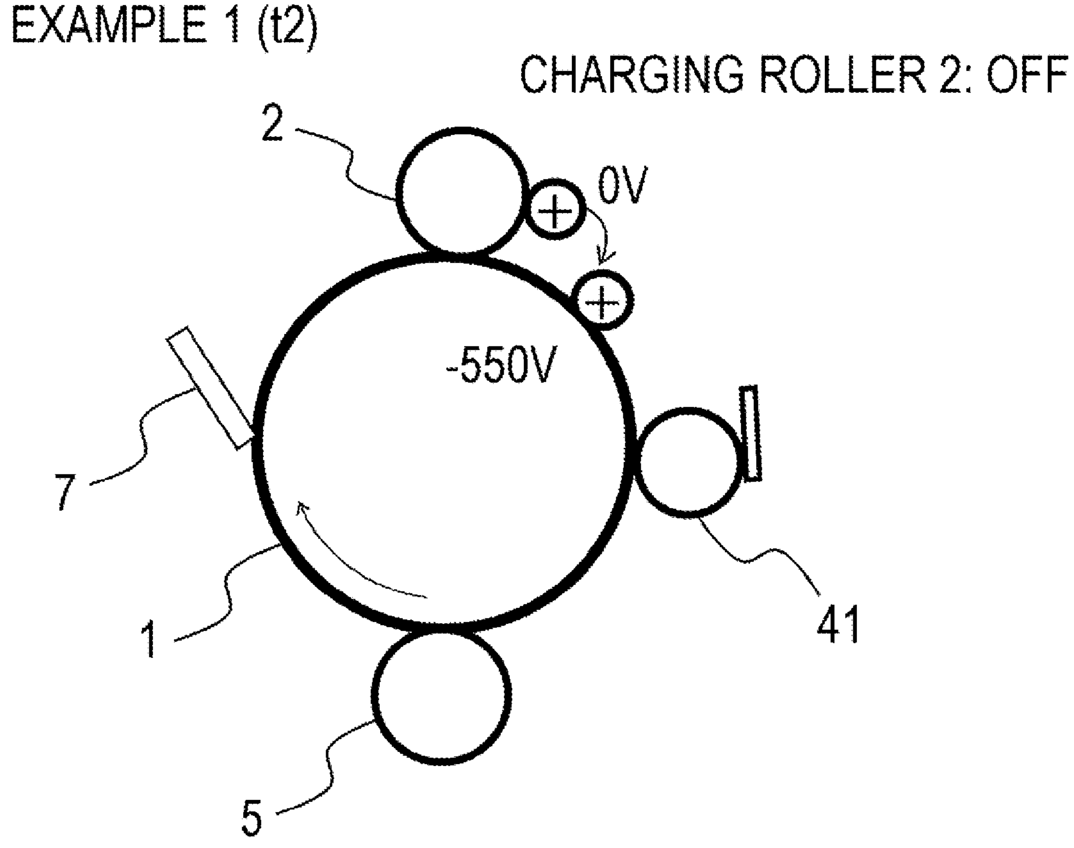
FIG. 5 is a schematic diagram of the process unit at (t2) in Example 1.
Figure 6:
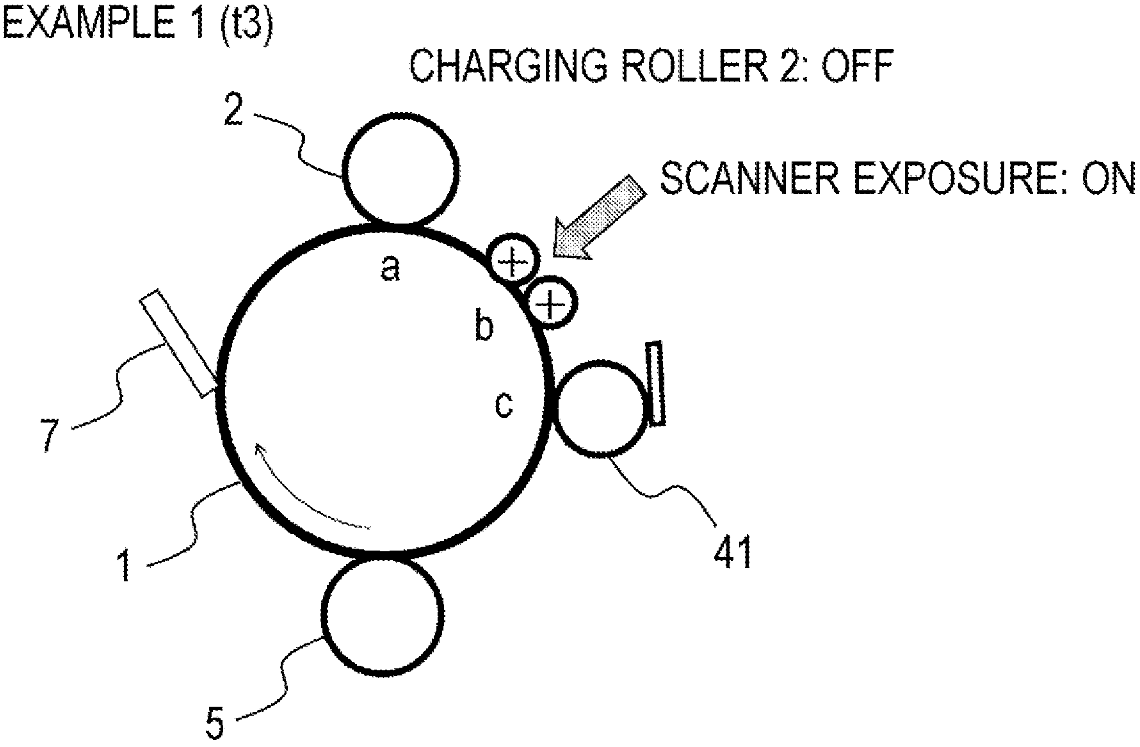
FIG. 6 is a schematic diagram of the process unit at (t3) in Example 1.
Figure 7:
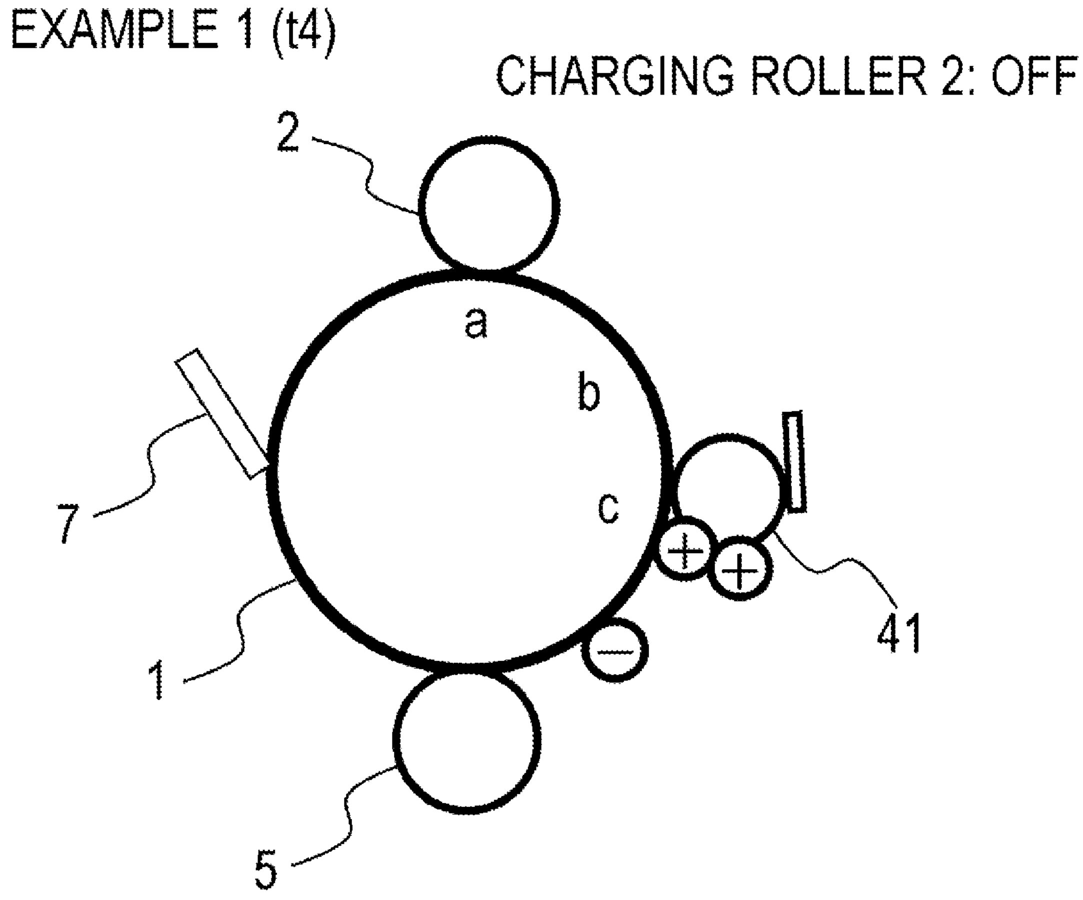
FIG. 7 is a schematic diagram of the process unit at (t4) in Example 1.

The development and collection sequence in the present embodiment will be explained in detail using FIG. 3. FIG. 3 is a schematic diagram of the development and collection sequence. FIGS. 4 and 5 are schematic diagrams of the configuration around the photosensitive drum 1 illustrating the cleaning operation of the positive external additive from the charging roller 2 at (t1) and (t2) in FIG. 3. FIGS. 6 and 7 are schematic diagrams of the configuration around the photosensitive drum illustrating the development and collection operation and toner purge operation at (t3) and (t4) in FIG. 3.

The overview of the development and collection sequence shown in FIG. 2 will be given hereinbelow. In the present example, the development and collection sequence is executed during the post-rotation operation. As shown in FIG. 2, in the development and collection sequence, first "A. Charging roller cleaning operation" is executed as the first operation, and then "B. Development and collection operation" as the second operation and "C. Toner purge operation" as the third operation are executed in parallel.

The details of "A. Charging roller cleaning operation" will be explained using FIGS. 3 to 5. The motor is driven continuously from the end of image formation, and the charging voltage is controlled to −1140 V in order to set the surface potential of the photosensitive drum 1 to −550 V by turning ON the charging voltage. Next, the motor drive is continued so that the photosensitive drum 1 rotates for at least one turn so that the surface potential of the photosensitive drum 1 becomes −550 V per turn ((t1) in FIG. 3, FIG. 4). Next, by turning OFF the charging voltage, the potential of the charging roller 2 is set to 0 V ((t2) in FIG. 3). At this time, since the surface potential of the photosensitive drum 1 is maintained at −550 V, a potential difference of 550 V is generated between the charging roller and the photosensitive drum at the charging portion (a) in FIG. 5 in the opposite direction to that at (t1) in FIG. 3. Due to this potential difference, the positive external additive that has adhered to the charging roller surface is transferred to the photosensitive drum surface by electrostatic force (FIG. 5). As the charging roller makes one turn while the potential difference is maintained, the motor is driven to clean the entire surface of the charging roller.

That is, the charging roller cleaning operation is a cleaning operation for removing adhering matter such as toner and external additive from the charging roller 2. In order to transfer the adhering matter from the charging roller 2 to the photosensitive drum 1, the following potential difference is created with respect to the surface potential formed on the photosensitive drum 1 at the charging position (charging portion) between the charging roller 2 and the photosensitive drum 1. That is, it is a potential difference (first potential difference) that generates an electrostatic force that transfers the adhering matter charged with an opposite polarity to the normal charging polarity of the toner from the charging roller 2 to the photosensitive drum 1. This potential difference is such that the potential of the charging roller 2 increases on the polarity side opposite to the normal charging polarity of the toner with respect to the surface potential of the photosensitive drum 1.

The period in which the first potential difference is created is a period in which the entire circumferential surface of the charging roller 2 that is in contact with the rotating photosensitive drum 1 and rotates in a driven manner is in contact with the circumferential surface of the photosensitive drum 1, this period corresponding to one turn of the charging roller 2.

The transfer voltage is turned OFF during the charging roller cleaning operation. However, the same negative bias as the charging voltage may be applied as the transfer voltage. By not changing the surface potential of the photosensitive drum 1 in the transfer portion, "B. Development and collection operation" and "C. Toner purge operation" of the next step can be performed stably. A positive bias transfer potential may be used, provided that the potential of the photosensitive drum 1 is not affected, but it is preferable that the potential of the photosensitive drum 1 be more positive than the transfer voltage. This is preferable from the standpoint of preventing the transfer roller 5 from being stained because in the apparatus configuration, such as in the present example, in which the developing roller 41 and the photosensitive drum 1 are not abutted-separated from each other in the development portion, there is a possibility that the toner may reach the transfer portion.

Next, details of "B. Development and collection operation" and "C. Toner purge operation" will be explained using FIGS. 6 and 7. After "A. Charging roller cleaning operation", "B. Development and collection operation" and "C. Toner purge operation" are performed in parallel.

Next, at (t3) in FIG. 3, the scanner exposure is turned ON when the surface of the photosensitive drum 1 onto which the positive external additive present on the charging roller 2 has migrated as a result of switching OFF the charging voltage in the charging portion (a) reaches the scanner exposure portion (b), thereby attenuating the potential of the surface of the photosensitive drum 1 from −550 V to −170 V (FIG. 6). Next, at (t4) in FIG. 3, the surface potential of the photosensitive drum 1 is attenuated to −170 V, and a developing voltage of −400 V is applied at the timing when the surface of the photosensitive drum 1 with the positive external additive adhered thereto reaches the development portion (c). As a result, the positive external additive adhered to the surface of the photosensitive drum 1 migrates to the surface of the developing roller 41 due to the potential difference between −170 V on the surface of the photosensitive drum 1 and −400 V of the developing voltage. The exposure amount at this time was set to $E0=0.24\ \mu J/cm^2$, which is the same as that during image formation. The time for forming a potential difference between the surface of the photosensitive drum 1 and the developing voltage was controlled to be longer than the time for turning off the charging voltage at (t3) in FIG. 3. This is done so to create an opportunity for all particles of the positive external additive that have migrated from the charging roller 2 onto the photosensitive drum 1 to be sufficiently collected to the developing roller 41. Further, since the developing roller 41 is rotationally driven with a difference in circumferential speed with respect to the photosensitive drum 1 (the speed of the circumferential surface of the developing roller 41 is made higher than the speed of the circumferential surface of the photosensitive drum 1), the positive external additive on the photosensitive drum 1 rolls in the development portion due to the difference in circumferential speed, whereby the migration from the surface of the photosensitive drum 1 to the developing roller 41 is facilitated. This series of operations is the development and collection operation (FIG. 7).

That is, the development and collection operation is a collection operation for removing adhered matter such as toner and external additive from the photosensitive drum 1. In order to transfer the adhered matter from the photosensitive drum 1 to the developing roller 41, the following potential difference is created between the photosensitive drum 1 and the developing roller 41 with respect to the surface potential formed on the photosensitive drum 1 at the developing position (development portion). That is, the potential difference (second potential difference) that generates an electrostatic force that transfers the adhered matter charged to an opposite polarity to the normal charging polarity of the toner from the photosensitive drum 1 to the developing roller 41 is generated.

At the same timing, in the development portion (c), the negative toner present on the developing roller 41 migrates to the surface of the photosensitive drum 1, whereby a toner purge operation is performed. The negative toner that migrated to the surface of the photosensitive drum 1 passes through the transfer portion as the photosensitive drum 1 rotates, and is supplied to the tip of the cleaning blade 7. At this time, in order to prevent the negative toner subjected to toner purge from adhering to the transfer roller 5, the transfer voltage is controlled to a negative bias while the toner passes through the transfer portion. Thereafter, the developing voltage is turned OFF, the motor drive is stopped, and the operation of the development and collection sequence is completed.

That is, the toner purge is a toner discharge operation that supplies the toner to the abutment portion (cleaning position) where the cleaning blade 7 abuts against the photosensitive drum 1. That is, this is an operation in which a toner image is developed on the photosensitive drum 1, and the toner image is removed by the cleaning blade 7 without being transferred to the transferred member at the transfer position. During this operation, at least the following periods occur. First, there is a period in which a voltage is applied to the charging roller 2 to charge the photosensitive drum 1. Further, there is a period during which the scanner unit 3 exposes the photosensitive drum 1. Furthermore, a period also occurs in which the transfer voltage is applied to the transfer roller 5 in order to generate an electrostatic force that prevents the toner image from being transferred to the transfer roller 5, that is, an electrostatic force that causes the toner charged to the normal charging polarity to move from the transfer roller 5 to the photosensitive drum 1. Hereinafter, the applied voltage at this time will also be referred to as a non-transfer voltage.

The region on the surface of the photosensitive drum 1 where the second potential difference was formed in the development and collection operation includes the region where the first potential difference was formed in the charging roller cleaning operation immediately before. Furthermore, the region on the surface of the photosensitive drum 1 where the first potential difference was formed in the charging roller cleaning operation is included in the region to which the toner is supplied in the toner purge operation when first passing through the development portion.

According to the present example, the potential difference (second potential difference) formed between the photosensitive drum 1 and the developing roller 41 in the development and collection operation after the charging roller cleaning operation is a potential difference that allows a toner image to be developed on the surface of the photosensitive drum 1 by the developer 44 borne by the developing roller 41. The development and collection operation and toner purge can thus be performed simultaneously.

Here, during the charging roller cleaning operation, the charging voltage Vp applied to the charging roller 2 and the surface potential Vd of the photosensitive drum 1 charged by the charging roller satisfy the following relational expression (1).

$$|Vp| < |Vd| \quad (1)$$

The potential difference between Vp and Vd (first potential difference) is preferably 350 V or more and at or below the discharge threshold.

The surface potential Va in the region of the surface of the photosensitive drum 1 where the first potential difference was formed during the charging roller cleaning operation, and the developing voltage Vdc applied to the developing roller 41 while at least this region is at the development position, these surface potential and developing voltage constituting the second potential difference during the development and collection operation, satisfy the following relational expression (2).

$$Va - Vdc > 0 \quad (2)$$

With the above control, the development and collection operation and toner purge can be executed simultaneously.

Example 2

Figure 8:
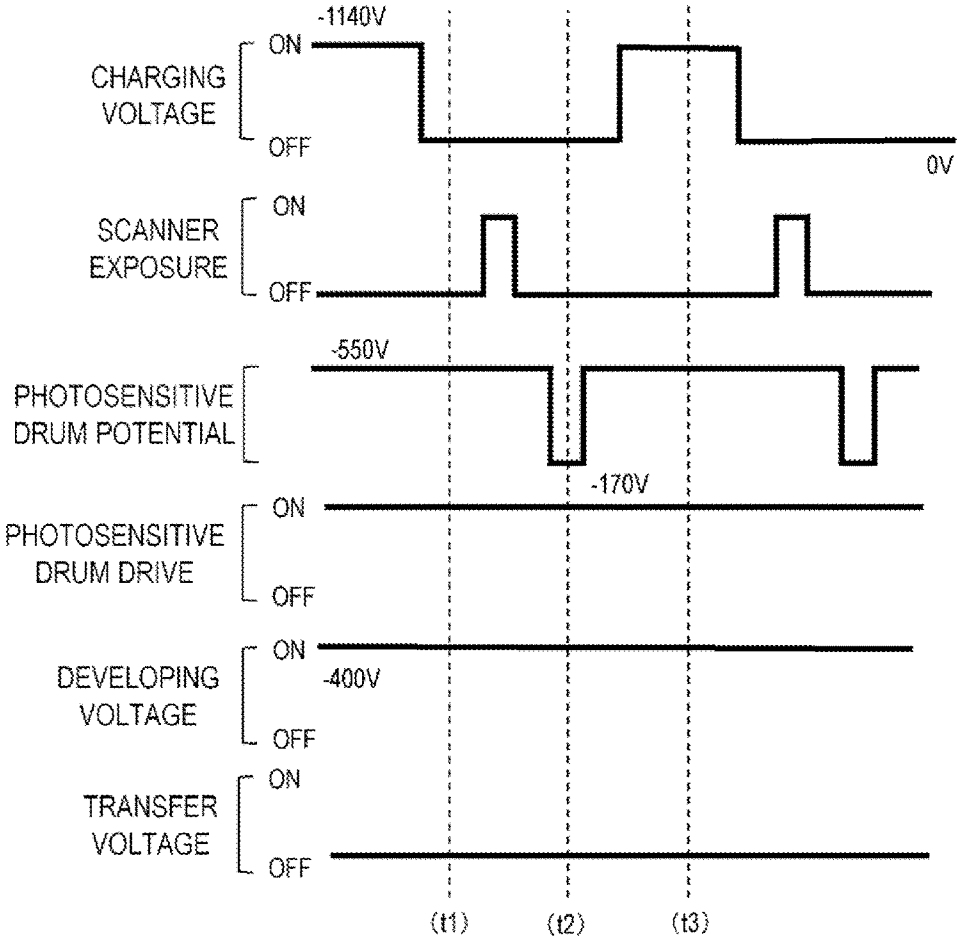
FIG. 8 is a sequence chart of the development and collection sequence operation in Example 2.

The overview of the development and collection sequence in Example 2 will be given hereinbelow using FIG. 8. In Example 2, the same components as in Example 1 are given the same reference numbers as in Example 1, and the explanation thereof will be omitted.

The difference between Example 2 and Example 1 is that the development and collection sequence is repeated multiple times, for example, twice. After the development and collection operation is completed at (t2) in FIG. 8, in order to perform "A. Charging roller cleaning operation" again, the charging voltage is turned ON at (t3) in FIG. 8, thereby applying −1140 V to the charging roller, the photosensitive drum potential that has dropped at (t2) is recharged, and the motor is driven until −550 V is reached in one rotation of the photosensitive drum. Thereafter, a second development and collection sequence is performed in the same manner as the first development and collection sequence. Thereafter, the developing voltage is turned OFF, the motor drive is stopped, and the operation of the development and collection sequence is completed.

Example 3

Figure 9:
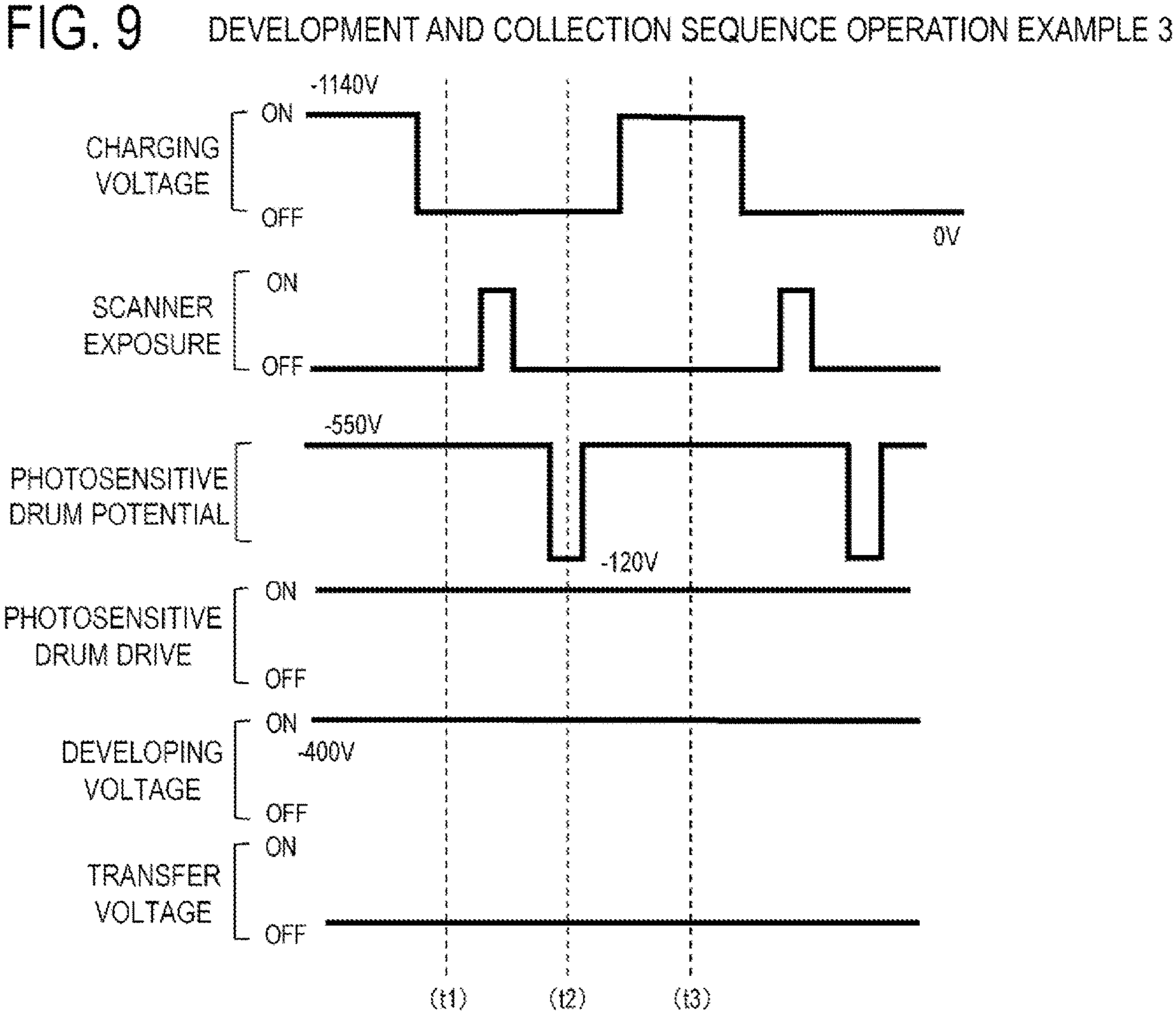
FIG. 9 is a sequence chart of the development and collection sequence operation in Example 3.

The overview of the development and collection sequence in Example 3 will be given hereinbelow using FIG. 9. In Example 3, the same components as in Example 1 and Example 2 are given the same reference numbers as in Example 1 and Example 2, and the explanation thereof will be omitted.

Example 3 differs from Example 2 in that in the development and collection operation, exposure is performed without performing a thinning process for making the photosensitive drum uniform in the main scanning direction of the scanner when scanner-exposing the surface of the photosensitive drum to which a positive external additive has adhered. As a result, in this example, the surface potential of the photosensitive drum after exposure in the central portion is smaller than in Example 2. The surface potential of the photosensitive drum is charged to −550 V by applying −1140 V to the charging roller, and then the potential in the exposed portion is attenuated to −170 V at the ends and to −150 V at the center by scanner exposure. The scanner exposure amount at this time was set to E0=0.24 μJ/cm$^2$.

Example 4

The overview of the development and collection sequence in Example 4 will be given hereinbelow. In Example 4, the same components as in Examples 1 to 3 are given the same reference numbers as in Examples 1 to 3, and the explanation thereof will be omitted. Further, the timing chart of the development and collection sequence of Example 4 is similar to the timing chart of the development and collection sequence of Example 2 shown in FIG. 8.

The difference between Example 4 and Example 2 is that in the development and collection operation, the scanner exposure amount on the photosensitive drum surface to which the positive external additive has adhered is made larger than that of Example 2. That is, the light quantity per unit area in Example 4 is made larger than the light quantity per unit area in Example 2. The surface potential of the photosensitive drum is charged to −550 V by applying −1140 V to the charging roller, and then the potential in the exposed portion is attenuated to −120 V by scanner exposure. The scanner exposure amount at this time was set to E0=0.45 μJ/cm$^2$.

Example 5

Figure 10:
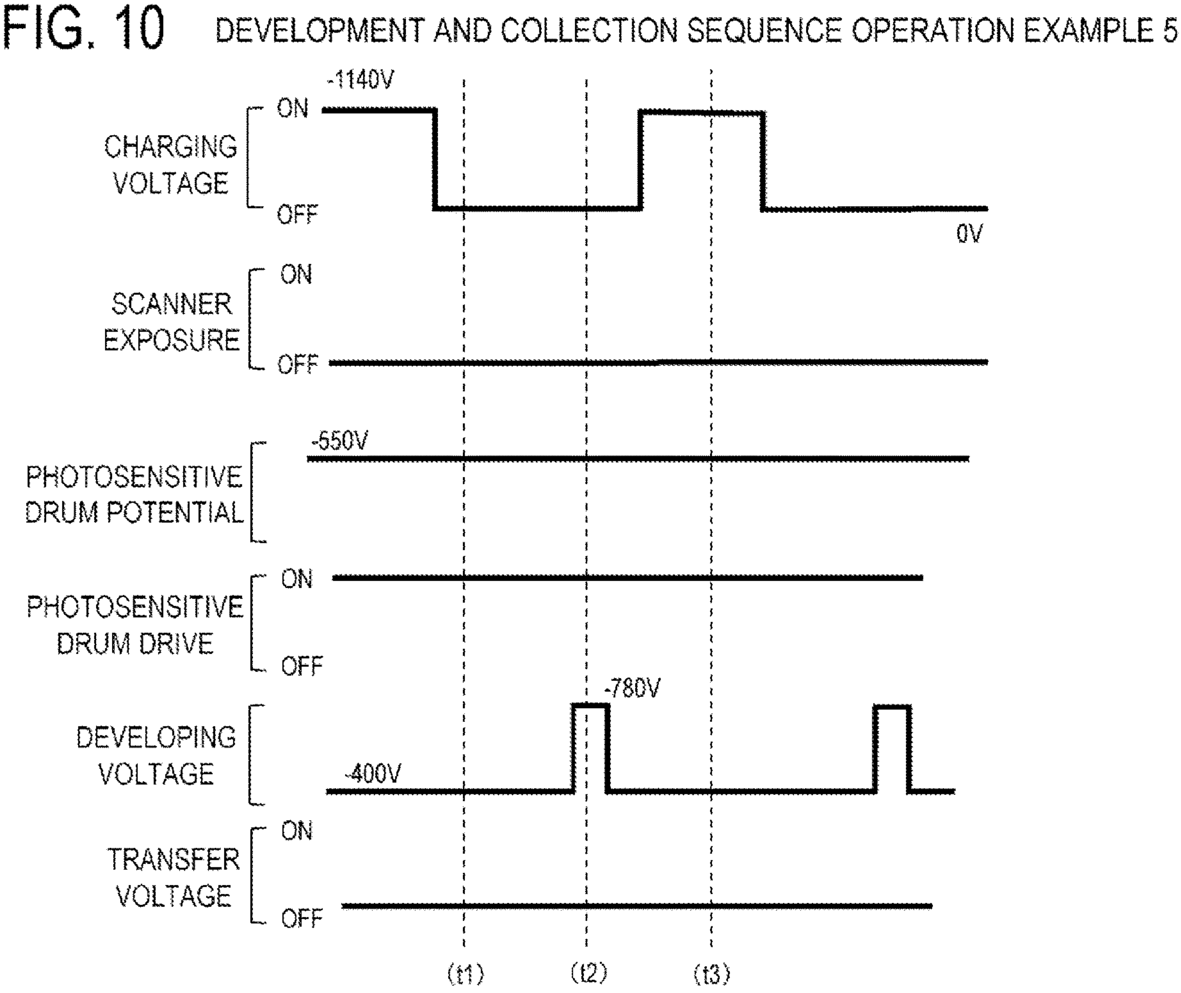
FIG. 10 is a sequence chart of the development and collection sequence operation in Example 4.

The overview of the development and collection sequence in Example 5 will be given hereinbelow by using FIG. 10. In Example 5, the same components as in Examples 1 to 3 are given the same reference numbers as in Examples 1 to 3, and the explanation thereof will be omitted.

The difference between Example 5 and Example 2 is that in the development and collection operation, a potential difference of 230 V is created with respect to the photosensitive drum surface potential (−550 V) by applying −780V to the developing roller at the timing when the surface to which the positive external additive has adhered reaches the development portion (c), without performing scanner exposure of the photosensitive drum surface to which the positive external additive has adhered. Due to this potential difference, the positive external additive present on the photosensitive drum is collected to the developing roller.

Evaluation Method for Each Example and Comparative Example

Image evaluation was performed for Examples 1 to 5 and Example 6 described below. Details of image evaluation will be explained below.

Durability Fogging Evaluation

Fogging is an image defect that appears like background smearing due to slight development of toner in white areas (unexposed areas) that are not normally printed. The amount of fogging was evaluated by the following method.

The image forming apparatus was stopped while a solid white image was being printed. The toner on the photosensitive drum after development and before transfer was transferred to a transparent tape, and the tape with the toner adhered thereto was attached to a recording paper or the like. Also, a tape to which no toner adhered was also attached onto the same recording paper at the same time. The optical reflectance of a green filter was measured from above the tapes attached to the recording paper by using an optical reflectance meter (TC-6DS, manufactured by Tokyo Denshoku Co., Ltd.), and the reflectance amount for the fogging was determined and evaluated as the fogging amount by subtracting the measurement result from the reflectance of the tape to which no toner was adhered. The fogging amount was measured at three or more points on the tape and the average value was determined.

A: Fogging amount is less than 1.0%.

B: Fogging amount is 1.0% to less than 3.0%.

C: Fogging amount is 3.0% to less than 5.0%.

D: Fogging amount is 5.0% to less than 7.0%.

E: Fogging amount is 7.0% or more.

Fogging evaluation was performed in a test environment of 32.5° ° C., 80% RH, after printing 7,000 sheets and 14,000 sheets, and after allowing to stand for 24 h. The printing test was conducted by continuously passing a recorded image of a horizontal line at an image ratio of 1.5%. Here, the horizontal line with an image ratio of 1.5% was specifically an image in which 197 dot lines were not printed after 3 dot lines were printed.

In addition, the evaluation after 7,000 sheets had been passed was defined as the middle stage of durability, and the image evaluation after 14,000 sheets was defined as the final stage of durability.

Table 1 shows the evaluation results of fogging in the middle and final stages of durability for Comparative Examples 1 and 2 and Examples 1 to 6.

the photosensitive drum and adhering to the charging roller. However, some of the external additives slip through the contact area between the cleaning blade and the photosensitive drum and adhere to the charging roller. Since the positive external additive that migrated from the developing roller to the photosensitive drum does not return onto the developing roller again, the amount of positive external additive in the developer container decreases. Therefore, in the fogging evaluation, the result is D in the middle stage of durability and E in the final stage of durability.

In Comparative Example 2, the development and collection sequence of Example 1 is not performed. In Comparative Example 2, the positive external additive adhered to the charging roller is transferred onto the photosensitive drum by performing the above-mentioned "A. Charging roller cleaning operation" during the post-rotation operation (FIG. 12). In the development portion, the positive external additive that migrated to the photosensitive drum is subjected to electrostatic force in the direction such that the positive external additive remains on the photosensitive drum due to the potential difference between the photosensitive drum surface potential of −550 V and the developing voltage of −400 V. Therefore, the positive external additive is not collected at the development portion, but passes through the development portion and is supplied to the tip of the cleaning blade. Similarly to Comparative Example 1, in Comparative Example 2, the positive external additive that migrated from the developing roller to the photosensitive drum also does not return onto the developing roller again, so that the amount of positive external additive in the developer container decreases. Therefore, in the fogging evaluation, the result is D in the middle stage of durability and E in the final stage of durability, as in Comparative Example 1.

TABLE 1

| | Configuration conditions | | | | Frequency of implementation | | | Evaluation contents | |
|---|---|---|---|---|---|---|---|---|---|
| Embodiments | Development purge | C roller CLN | Development and collection | Potential difference at time of positive collection | Number of repetitions | (from initial period to middle stage of durability) | Frequency of implementation (after middle stage of durability) | Fogging (middle stage of durability) | Fogging (final stage of durability) |
| Comparative Example 1 | performed | — | — | — | — | — | — | D | E |
| Comparative Example 2 | — | performed | — | — | — | — | — | D | B |
| Example 1 | performed | performed | performed | 250 V | 1 | 100 sheets | 100 sheets | C | D |
| Example 2 | performed | performed | performed | 250 V | 2 | 100 sheets | 100 sheets | B | C |
| Example 3 | performed | performed | performed | 270 V/250 V | 2 | 100 sheets | 100 sheets | A | B |
| Example 4 | performed | performed | performed | 280 V | 2 | 100 sheets | 100 sheets | A | B |
| Example 5 | performed | performed | performed | 250 V | 2 | 100 sheets | 100 sheets | B | C |
| Example 6 | performed | performed | performed | 270 V/250 V | 2 | 100 sheets | 20 sheets | A | A |

Superiority of the Present Invention Over Comparative Examples

Figure 11:
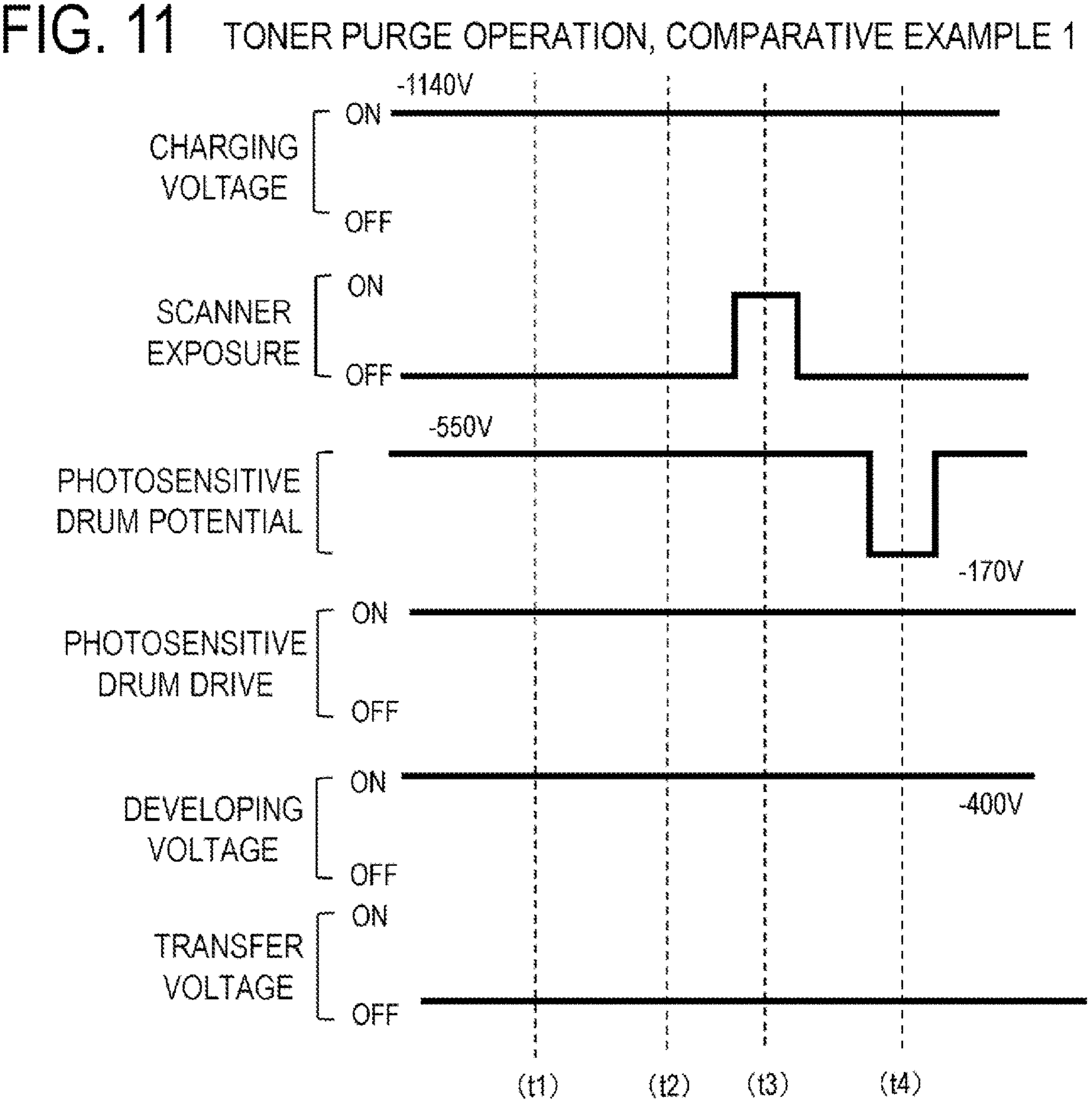
FIG. 11 is a sequence chart of the development and collection sequence operation in Comparative Example 1.

The superiority of the present invention over Comparative Examples 1 and 2 will be described hereinbelow. First, in Comparative Example 1, the development and collection sequence of Example 1 is not performed. In Comparative Example 1, a toner purge operation is performed by transferring the negative toner on the developing roller to the photosensitive drum surface in the development portion during the post-rotation operation (FIG. 11). By supplying the developer to the tip of the cleaning blade, a blocking layer is formed to prevent the external additive from slipping through the contact portion between the cleaning blade and The superiority of the present invention over Comparative Examples 1 and 2 will be explained using Example 1.

In Example 1, while exhibiting the effects of the toner purge operation of Comparative Example 1 and the charging roller cleaning operation of Comparative Example 2, the effect of developing and collecting the positive external additive that migrated onto the photosensitive drum 1 during the charging roller cleaning operation is achieved. Thereby, the positive external additive that migrated from the developing roller 41 to the photosensitive drum 1 can be collected to the developing roller 41 again, and the amount of positive external additive in the developer container 4 can be maintained throughout the durability. Therefore, Example 1 has better fogging evaluation results than comparative examples.

Other Examples that are More Effective

Next, other examples that are more effective than Example 1 will be described. Example 2 differs from Example 1 in that the development and collection sequence operation is repeated twice. In order to cause the migration of the positive external additive that adhered to the charging roller to the photosensitive drum, one charging roller cleaning operation may not be sufficient. This is because if there is a large amount of positive external additive that has adhered to the charging roller 2, it is difficult to cause the migration of the entire positive external additive to the photosensitive drum 1 in one charging roller cleaning operation. In Example 2, by repeating the development and collection sequence twice, a larger amount of the positive external additive can be discharged from the charging roller 2 and collected to the developing roller 41 than in Example 1. Thereby, the amount of positive external additive in the developer container can be maintained better than in Example 1. Therefore, the fogging evaluation result is one rank better than that of Example 1.

Example 3 differs from Example 2 in that the thinning process is not performed when the scanner emits light in the development and collection sequence. As a result, the surface potential of the photosensitive drum after scanner exposure assumes a lower value in a part of the length of the photosensitive drum than during image formation. Further, since the potential difference between the developing voltage and the photosensitive drum in the development portion is larger than that in Example 2, the efficiency of development and collection of the positive external additive is further improved. As a result, the amount of positive external additive in the developer container can be maintained better than in Example 2. Therefore, the fogging evaluation result is one rank better than that of Example 2.

In Example 4, the same thinning process as during image formation is performed when the scanner emits light in the development and collection sequence, but the difference from Example 2 is that the scanner exposure amount is larger than during image formation. Further, since the potential difference between the developing voltage and the photosensitive drum in the development portion is larger than that in Example 2, the efficiency of development and collection of the positive external additive is further improved. As a result, the amount of positive external additive in the developer container 4 can be maintained better than in Example 2. Therefore, the fogging evaluation result is one rank better than that of Example 2.

Example 5 differs from Example 2 in that the scanner does not emit light in the development and collection sequence, a potential difference with the surface potential of the photosensitive drum 1 is created by changing the developing voltage, and the positive external additive on the photosensitive drum 1 is collected to the developing roller 41. As a result, the development and collection of positive external additive is not limited to the longitudinal width that can be scanner-exposed, and a sufficient region can be collected for the longitudinal width on the photosensitive drum 1 where the positive external additive has adhered. This is because the longitudinal width where the positive external additive migrated from the development portion onto the photosensitive drum 1 is the same as the width of the toner coat on the developing roller 41, and the width of the positive external additive that slips through the cleaning blade 7 and adheres to the charging roller 2 is also the same, so the width resulting from discharge from the charging roller 2 onto the photosensitive drum 1 in the development and collection sequence is also the same as the toner coat width on the developing roller 41. Where a potential difference with the surface potential of the photosensitive drum 1 is created by controlling the developing voltage, the width of the toner coat on the developing roller 41 becomes the width where the development and collection can be performed, and the entire area of the longitudinal width where the positive external additive discharged onto the photosensitive drum 1 has adhered cam be developed and collected. In addition, since the surface potential of the photosensitive drum 1 does not decrease due to scanner exposure, when the development and collection sequence is repeated multiple times, the sequence time can be reduced and the downtime can be shortened because there is no need to re-charge the photosensitive drum 1 to −550 V.

Example 6 differs from Example 3 in that the frequency of implementation of the development and collection sequence is different between before the middle stage of durability (7000 sheets passed) and after the middle stage of durability. Before the middle stage of durability, the development and collection sequence is performed for every 100 sheets passed (2 sheets per job are passed) as in Example 3, but after the middle stage of durability, the development and collection sequence is performed for every 20 sheets passed. In other words, after the middle stage of durability, the frequency of implementation of the development and collection sequence is increased. This is because in the latter half of durability, the amount of positive external additive released from the toner surface due to stress on the toner is increased, and the amount of positive external additive applied to the photosensitive drum 1 increases. By increasing the frequency of implementation of the development and collection sequence, it is possible to maintain the amount of positive external additive in the developer container, so the fogging evaluation at the final stage of durability was as good as in the middle stage of durability.

It follows from the above that although the present invention has been described with respect to the post-rotation operation, it is not limited thereto, and can also be applied to sequence operations during non-image formation. Furthermore, although the present invention has been described with respect to a so-called monochrome image forming apparatus in which one cartridge can be mounted on the image forming apparatus, the effects of the present invention can be obtained by using a similar configuration with respect to a full-color image forming apparatus which has a plurality of cartridges and in which the toner is transferred to an intermediate transfer member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-212533, filed on Dec. 28, 2022, which is hereby incorporated by reference herein in its entirety.

What is claimed is:

1. An image forming apparatus comprising:

an image bearing member configured to rotate;

a charging member configured to contact with the image bearing member and to rotate while forming a charging portion, the charging member charging a surface of the image bearing member at the charging portion;

a charging voltage applying portion configured to apply charging voltage to the charging member;

an exposure unit configured to expose the surface of the image bearing member charged by the charging member;

a developer bearing member configured to bear developer, face the image bearing member at a development portion, and supply the developer to the surface of the image bearing member;

a developing voltage applying portion configured to apply developing voltage to the developer bearing member;

a transfer member configured to transfer the developer, which has been supplied to the surface of the image bearing member at a transfer portion, onto a transferred member;

a transfer voltage applying portion configured to apply transfer voltage to the transfer member;

a cleaning member configured to contact the image bearing member at a cleaning portion which is formed on a downstream side of the transfer portion and on an upstream side of the charging portion in a rotating direction of the image bearing member, wherein the cleaning member is a cleaning blade abutting against the image bearing member and configured to remove the developer before being transferred to the transfer portion; and a control portion configured to control the charging voltage applying portion, the developing voltage applying portion, and the transfer voltage applying portion, wherein the control portion is further configured to execute a first operation to move the developer from a surface of the charging member to the surface of the image bearing member by controlling the charging voltage applying portion;

a second operation to move the developer from the surface of the image bearing member to the developer bearing member by controlling the charging voltage applying portion and the developing voltage applying portion; and a third operation to supply the developer to the cleaning portion by controlling the charging voltage applying portion, the developing voltage applying portion, and the transfer voltage applying portion, wherein in the first operation, between the charging member and the image bearing member, the control portion controls the charging voltage applying portion so as to generate a first potential difference that generates an electrostatic force to move developer, which is charged to an opposite polarity to a normal charging polarity of the developer, from the charging member to the image bearing member, wherein in the second operation, between the image bearing member and the developer bearing member, the control portion controls the developing voltage applying portion so as to generate a second potential difference, that generates an electrostatic force to move developer, which is charged to an opposite polarity opposite to the normal charging polarity of the developer, from the image bearing member to the developer bearing member;

in the third operation, the control portion controls to apply the transfer voltage having a polarity corresponding to the normal charging polarity of the developer by the transfer voltage applying portion while the developer passes through the transfer portion; and wherein a region on the surface of the image bearing member where the second potential difference is generated in the second operation includes a region where the first potential difference is generated in the first operation.

2. The image forming apparatus according to claim 1, wherein a region on the surface of the image bearing member where the first potential difference is generated in the first operation is included in a region to which the developer is supplied in the third operation while the surface of the image bearing member passes through the development portion first.

3. The image forming apparatus according to claim 1, wherein a charging voltage Vp applied to the charging member by the charging voltage applying portion in the first operation, and a surface potential Vd of the image bearing member charged by the charging member to which the charging voltage Vp has been applied, which constitute the first potential difference, satisfy the following relational expression (1).

$$|Vp| < |Vd| \tag{1}$$

4. The image forming apparatus according to claim 3, wherein the difference between the Vp and the Vd is greater than or equal to 350 V and less than or equal to a discharge threshold.

5. The image forming apparatus according to claim 3, wherein a surface potential Va in a region of the surface of the image bearing member where the first potential difference was generated in the first operation, and a developing voltage Vdc applied by the developing voltage applying portion to the developer bearing member at least while the region is in the development portion, which constitute the second potential difference, satisfy the following relational expression (2).

$$Va - Vdc > 0 \tag{2}$$

6. The image forming apparatus according to claim 5, wherein the Va is created by exposing the region by the exposure unit.

7. The image forming apparatus according to claim 5, wherein a period in which the relational expression (2) is satisfied is longer than a period in which the relational expression (1) is satisfied.

8. The image forming apparatus according to claim 1, wherein the second potential difference is generated by exposing the region of the surface of the image bearing member where the first potential difference was generated in the first operation by the exposure unit.

9. The image forming apparatus according to claim 5, wherein a light quantity per unit area in the region in a case where the exposure unit exposes the region is larger than a light quantity per unit area in a surface of the image bearing member in a case where the surface is exposed by the exposure unit at the time of image formation in which an image is formed on the transferred member.

10. The image forming apparatus according to claim 1, wherein the second potential difference is generated by the developing voltage applying portion changing the developing voltage applied to the developer bearing member while the region of the surface of the image bearing member where the first potential difference has been generated in the first operation is present in at least the development portion.

11. The image forming apparatus according to claim 1, wherein a sequence operation in which the second operation and the third operation are performed simultaneously following the first operation is repeated multiple times.

12. The image forming apparatus according to claim 1, wherein a period in which the first potential difference is generated is a period in which an entire circumferential surface of the charging member is in contact with a circumferential surface of the image bearing member, and the period in which the first potential difference is generated is longer than a period corresponding to one rotation of the charging member.

13. The image forming apparatus according to claim 1, wherein a speed of a circumferential surface of the developer bearing member is greater than a speed of a circumferential surface of the image bearing member.

14. The image forming apparatus according to claim 1, wherein the developer includes a toner particle for which a normal charging polarity is negative, and an external additive which is externally added to the toner and for which a normal charging polarity is positive.

15. The image forming apparatus according to claim 14, wherein fine strontium titanate powder is used as the external additive.

16. The image forming apparatus according to claim 15, wherein in the external additive, the number-average particle diameter of primary particles is 30 nm to 300 nm.

* * * * *